US012723877B2

(12) United States Patent
Becker

(10) Patent No.: US 12,723,877 B2
(45) **Date of Patent: *Sep. 1, 2026**

(54) TOOL BASED WELDING TECHNIQUE MONITORING SYSTEMS

(71) Applicant: ILLINOIS TOOL WORKS INC., Glenview, IL (US)

(72) Inventor: William Joshua Becker, Manitowoc, WI (US)

(73) Assignee: ILLINOIS TOOL WORKS INC.

( * ) Notice: Subject to any disclaimer, the term of this patent is extended or adjusted under 35 U.S.C. 154(b) by 479 days.

This patent is subject to a terminal disclaimer.

(21) Appl. No.: 18/106,712

(22) Filed: Feb. 7, 2023

(65) Prior Publication Data

US 2023/0324178 A1 Oct. 12, 2023

Related U.S. Application Data

(60) Provisional application No. 63/328,311, filed on Apr. 7, 2022.

(51) Int. Cl.
*G01C 21/16* (2006.01)
*B23K 31/12* (2006.01)

(52) U.S. Cl.
CPC ............ *G01C 21/16* (2013.01); *B23K 31/125* (2013.01)

(58) Field of Classification Search
None
See application file for complete search history.

(56) References Cited

U.S. PATENT DOCUMENTS

| | | | |
|---|---|---|---|
| 5,318,234 A | 6/1994 | Biggs et al. |
| 6,012,664 A | 1/2000 | Duclos et al. |
| 8,680,434 B2 | 3/2014 | Stoger et al. |
| 9,403,234 B2 | 8/2016 | Christopher et al. |
| 9,511,443 B2 | 12/2016 | Pfeifer et al. |

(Continued)

FOREIGN PATENT DOCUMENTS

| | | |
|---|---|---|
| CN | 113857633 | 12/2021 |
| DE | 202004018003 | 2/2005 |

(Continued)

OTHER PUBLICATIONS

European Patent Office, Search Report, Application No. 23191754.3, dated Feb. 1, 2024, 14 pages.

(Continued)

*Primary Examiner* — Mark A Shabman
(74) *Attorney, Agent, or Firm* — MCANDREWS HELD & MALLOY LTD.

(57) ABSTRACT

Described herein are examples of tool based welding technique monitoring systems that provide an inexpensive, intuitive, and relatively robust way of tracking an orientation of a welding-type tool, and providing welding technique feedback based on the orientation. The system requires no sensors apart from a simple and/or relatively inexpensive sensor module that can travel with the welding-type tool, which makes the system highly portable. The system can also provide some feedback with minimal calibration, which can be valuable in situations where an operator forgets, or is unwilling, to take the time to fully calibrate the system. Additionally, full calibration of the system can be accomplished with a fast, simple, intuitive calibration technique.

20 Claims, 9 Drawing Sheets

(56) References Cited

U.S. PATENT DOCUMENTS 9,522,437 B2 12/2016 Pfeifer et al.
9,922,460 B2 3/2018 Denis
9,975,196 B2 5/2018 Zhang et al.
10,032,388 B2 7/2018 Sommers et al.
10,373,517 B2 8/2019 Becker et al.
10,380,911 B2 8/2019 Hsu et al.
10,402,959 B2 9/2019 Becker et al.
10,512,983 B2 12/2019 Zhang
10,596,650 B2 3/2020 Pfeifer
10,773,330 B2 9/2020 Zhang et al.
10,864,593 B2 12/2020 Lahti et al.
10,913,125 B2 2/2021 Meess et al.
11,285,557 B2 3/2022 Mehlman et al.
11,403,962 B2 8/2022 Schneider
2005/0251294 A1 11/2005 Cerwin
2009/0276930 A1* 11/2009 Becker ................. B23K 9/0956 2/8.2
2009/0298024 A1* 12/2009 Batzler .................... G09B 5/00 434/234
2010/0062405 A1* 3/2010 Zboray .................. G09B 19/24 434/234
2011/0006047 A1 1/2011 Penrod
2013/0112677 A1 5/2013 Christopher et al.
2014/0313045 A1 10/2014 Leboff
2015/0187198 A1 7/2015 Silverberg
2015/0235565 A1* 8/2015 Postlethwaite .......... G09B 5/06 434/234
2016/0125761 A1* 5/2016 Becker ................... G09B 19/24 434/234
2016/0163221 A1* 6/2016 Sommers ............. B23K 9/0956 434/234
2016/0193679 A1 7/2016 Zhang et al.
2016/0214198 A1* 7/2016 Hsu ...................... B23K 9/0956
2017/0046974 A1 2/2017 Becker et al.
2017/0095873 A1 4/2017 Pfeifer et al.
2017/0136567 A1 5/2017 Lahti et al.
2017/0323584 A1* 11/2017 Daniel ............... G02B 27/0172
2018/0126476 A1 5/2018 Meess et al.
2018/0308385 A1 10/2018 Sommers et al.
2020/0043366 A1 2/2020 Schneider
2020/0198042 A1 6/2020 Imamachi
2020/0246891 A1 8/2020 Mehlman et al.
2021/0027659 A1 1/2021 Becker
2022/0258267 A1 8/2022 Becker

FOREIGN PATENT DOCUMENTS

EP 3138651 3/2017
WO 2005102230 11/2005

OTHER PUBLICATIONS

Tedaldi Et al.; A robust and easy to implement method for IMU calibration without external equipments, 2014 IEEE International Conference on Robotics and Automation (ICRA), IEEE, May 31, 2014, pp. 3042-3049.
Wire Wizard Welding Products, Wire Tracker Digital Wire Monitor, retrieved from https://www.wire-wizard.com/product/wire-tracker-wire-monitor/, retrieved on Jul. 18, 2023, 4 pages.
European Patent Office, Search Report, Application No. 23176587.6, dated Oct. 19, 2023, 9 pages.
Won et al.; A Fastening Tool Tracking System Using an IMU and a Position Sensor with Kalman Filters and a Fuzzy Expert System, IEEE Transactions on Industrial Electronics, vol. 56, No. 5, May 2009. 11 pages.
European Patent Office, Search Report, Application No. 23163633.3, dated Sep. 20, 2023, 8 pages.
European Patent Office, Search Report, Application No. 23176585.0 dated Oct. 13, 2023, 8 pages.
Canada Patent Office, Office Action, Application No. 3,209,465, dated Nov. 18, 2024, 5 pages.
Aiteanu, Dorin, Virtual and Augmented Reality Supervisor for a New Welding Helmet, Publication Series of the Institute of Automation, University of Bremen, 2006, 154 pages.
IPB-AG, Intelligent welding torch, 12 pages.
Zhang et al., Measurement of three-dimensional welding torch orientation for manual arc welding process, IOP Publishing, Measurement of Science and Technology, 25 (2014) 19 pages.
Realityworks, guideWELD Live real welding guidance system, https://www.realityworks.com/product/guideweld-live-real-welding-guidance-system/, retrieved on Feb. 7, 2023, 2 pages.
European Patent Office, Office Action, Application No. 23163633.3-1103, dated Apr. 14, 2025, 6 pages.

* cited by examiner

TOOL BASED WELDING TECHNIQUE MONITORING SYSTEMS

CROSS REFERENCE TO RELATED APPLICATIONS

This application claims priority to U.S. Provisional Patent Application No. 63/328,311, filed Apr. 7, 2022, entitled "TOOL BASED WELDING TECHNIQUE MONITORING SYSTEMS," the entire contents of which are hereby incorporated by reference.

TECHNICAL FIELD

The present disclosure generally relates to welding technique monitoring systems, and, more particularly, to tool based welding technique monitoring systems.

BACKGROUND

Welding technique generally refers to the way in which a welding operator positions, moves, and/or manipulates a welding-type tool relative to a workpiece (and/or a welding joint of the workpiece), such as, for example, during a welding-type operation. Good welding technique can positively impact the quality of a weld. Bad welding technique can negatively impact the quality of a weld. However, it can sometimes be difficult for (e.g., less experienced) human operators to accurately judge whether welding technique is good or bad.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to tool based welding technique monitoring systems, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
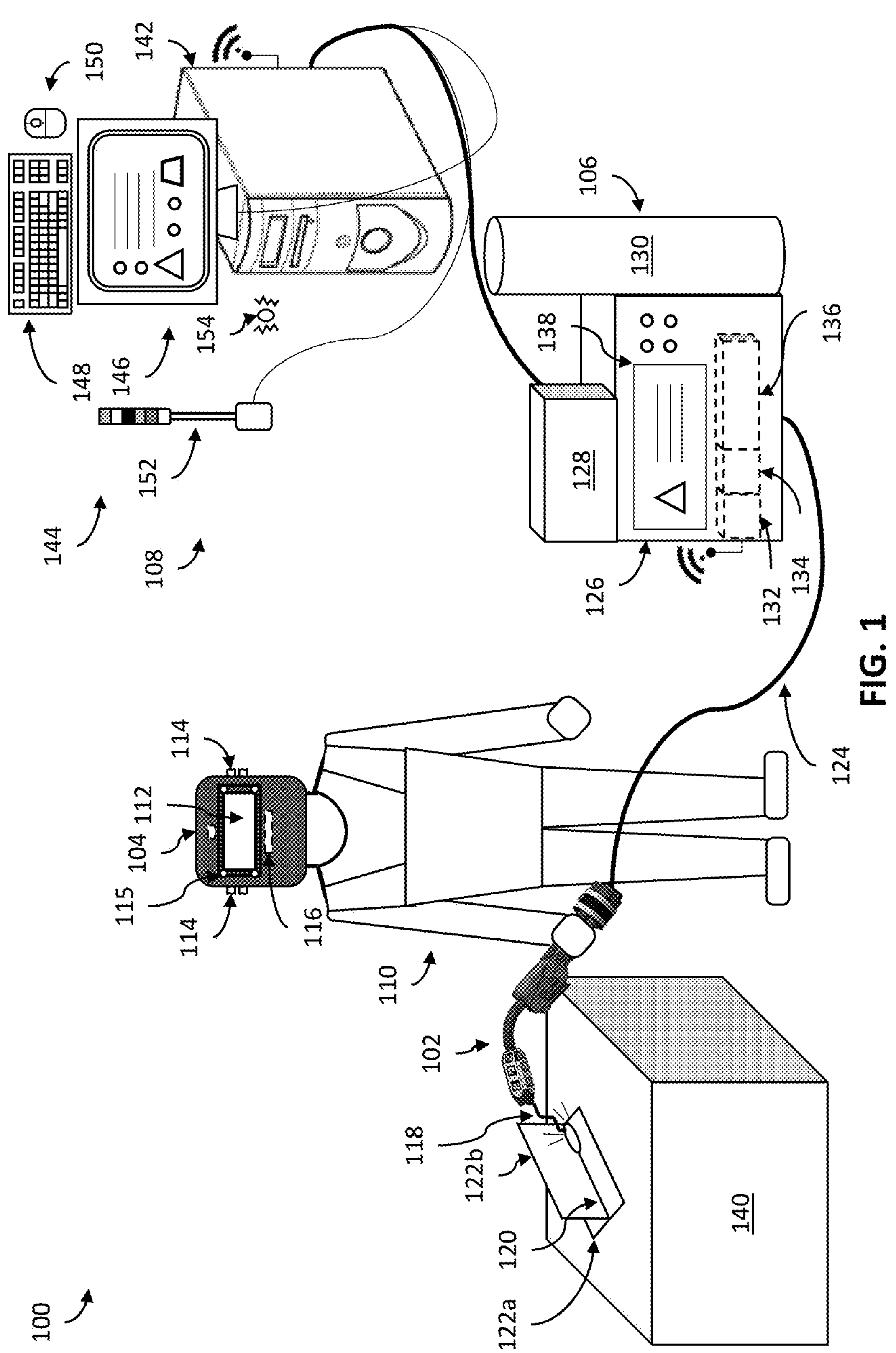
FIG. 1 shows an example of a welding system, in accordance with aspects of this disclosure.

The figures are not necessarily to scale. Where appropriate, the same or similar reference numerals are used in the figures to refer to similar or identical elements. For example, reference numerals utilizing lettering (e.g., workpiece 122*a*, workpiece 122*b*) refer to instances of the same reference numeral that does not have the lettering (e.g., workpieces 122).

DETAILED DESCRIPTION

Some examples of the present disclosure relate to a tool based welding technique monitoring system. In some examples, the tool based technique monitoring system uses sensor data of a sensor module attached to, and/or integral with, a welding-type tool to track an orientation of the welding-type tool. In some examples, the technique monitoring system uses the tracked orientation of the welding-type tool, along with certain joint characteristic information, to determine, and/or provide feedback with respect to, real-time welding technique parameters (e.g., work angle, travel angle, travel direction, travel speed, push/pull, etc.).

The tool based welding technique monitoring system is relatively inexpensive and highly portable. The sensor module can travel with the welding-type tool, and no additional sensors are required. The system can also provide some feedback with minimal calibration, which can be valuable in situations where an operator forgets, or is unwilling, to take the time to fully calibrate the system. Additionally, full calibration of the system can be accomplished with a fast, simple, intuitive calibration technique.

FIG. 1 shows an example welding system 100. As shown, the welding system 100 includes a welding-type tool 102, welding helmet 104, welding equipment 106, and computing system 108.

While shown as a welding torch or gun configured for gas metal arc welding (GMAW) in the example of FIG. 1, in some examples, the welding-type tool 102 may instead be a different kind of welding-type tool 102. For example, the welding-type tool 102 may be an electrode holder (i.e., stinger) configured for shielded metal arc welding (SMAW), a torch and/or filler rod configured for gas tungsten arc welding (GTAW), a welding gun configured for flux-cored arc welding (FCAW), and/or a plasma cutter. While shown as a live welding-type tool 102 in the example of FIG. 1, in some examples, the welding-type tool 102 may be a mock welding-type tool, and/or be configured for mock (as opposed to live) welding-type operations, such as for (e.g., virtual/augmented reality) weld training.

In the example of FIG. 1, the welding-type tool 102 is shown being held by an operator 110 wearing the welding helmet 104. In the example of FIG. 1, the welding helmet 104 includes a helmet display screen 112, helmet user interface (UI) devices 114, helmet sensors 105, and helmet circuitry 116. In some examples, the helmet UI devices 114 may include knobs, buttons, levers, switches, touch screens, microphones, speakers, haptic devices, lights (e.g., LEDs), eye trackers, and/or other appropriate helmet UI devices 114. In some examples, the helmet sensors 105 may include optical, camera, infra-red, heat, ultrasonic, electromagnetic, and/or other appropriate sensors. In some examples, the helmet sensors 105 may be used to determine whether a (e.g., live) welding-type operation is taking place (e.g., via measurement of accompanying light, heat, sound, electromagnetic fields, etc.). While shown on the outside of the welding helmet 104 in the example of FIG. 1, in some examples, one or more of the helmet UI devices 114 and/or helmet sensors 105 may be positioned within the welding helmet 102. In some examples, the helmet display screen 112 may be considered part of the helmet UI devices 114. In some examples, the helmet UI devices 114 and/or helmet sensors 105 may be electrical communication with the helmet circuitry 116.

In some examples, the helmet circuitry 116 may include helmet processing circuitry, helmet memory circuitry, helmet UI circuitry, and/or helmet communication circuitry. In some examples, the helmet UI circuitry may drive the helmet UI devices 114. In some examples, the welding helmet 104 may communicate with one or more external devices via one or more signals sent or received by the helmet communication circuitry.

In the example of FIG. 1, the welding-type tool 102 is shown applying a welding arc 118 to a joint 120 between two workpieces 122 (e.g., to weld the workpieces together at the joint 120). As shown, the welding-type tool 102 is connected to a welding cable 124 that leads to, and puts the welding-type tool 102 in electrical communication with, the welding-type equipment 106. In some examples, welding-type power (and/or consumables) for the welding arc 118 may be provided to the welding-type tool 102, by the welding equipment 106, via the welding cable 124. In some examples, the welding-type tool 102 may transmit one or more signals to the welding-type equipment 106 when activated (e.g., via the welding cable 124), and the welding-type equipment 106 may provide the welding-type power (and/or consumables) for the arc 118 in response.

In the example of FIG. 1, the welding-type equipment 106 comprises a welding-type power supply 126, wire feeder 128, and gas supply 130. In some examples, the wire feeder 128 may be configured to feed wire to the welding-type tool 102 (e.g., via welding cable 124). In some examples, the gas supply 130 may be configured to route shielding gas to the welding-type tool 102 (e.g., via welding cable 124). In some examples, the power supply 126 may be configured to route welding-type power to the welding-type tool 102 (e.g., via welding cable 124).

In the example of FIG. 1, the power supply 126 includes power communication circuitry 132, power control circuitry 134, and power conversion circuitry 136 interconnected with one another. In some examples, the power supply 126 may communicate with one or more external devices via one or more signals sent or received by the power communication circuitry 132. In some examples, the power conversion circuitry 136 may be configured to receive input power (e.g., from a generator, a battery, mains power, etc.) and convert the input power to welding-type output power, such as might be suitable for use by the welding-type tool 102 for welding-type operations. In some examples, the power control circuitry 134 may be configured to control operation of the power communication circuitry 132 power conversion circuitry 136, wire feeder 128, and/or gas supply 130 (e.g. via one or more control signals) in accordance with one or more welding parameters.

In the example of FIG. 1, the welding-type equipment 106 further includes an operator interface 138. In some examples, the operator interface 138 may comprise one or more display screens, touch screens, knobs, buttons, levers, switches, microphones, speakers, lights, and/or other mechanisms through which an operator 110 may provide input to, and/or receive output from, the welding-type equipment. For example, an operator 110 may use the operator interface 138 to input one or more welding parameters (e.g., target voltage, current, wire feed speed, wire/filler type, wire/filler diameter, gas type, gas flow rate, welding-type process, material type of workpiece 122, position of welding-type process, etc.). As another example, the operator 110 may use the operator interface 138 to view and/or otherwise understand the current welding parameters of the welding-type equipment 106.

While shown as part of the power supply 126 in FIG. 1, in some examples, the operator interface 138, power control circuitry 134, and/or power communication circuitry 132 (and/or some other control/communication circuitry) may be part of the wire feeder 128 and/or gas supply 130. In some examples, the welding-type equipment 106 may be omitted entirely, or may be mock and/or simulated welding-type equipment 106, such as may be used for training, simulated, and/or mock welding-type operations. While not shown for the sake of simplicity, in some examples, the welding-type equipment 106 may also be connected to, and/or provide power to (e.g., via a cable and/or clamp), a welding bench 140, and/or the workpiece(s) 122 supported by the welding bench 140.

In the example of FIG. 1, the welding-type equipment 106 is further shown connected to a computing system 108 having a computing device 142 and several computing user interface (UI) devices 144. In the example of FIG. 1, the computing UI devices 144 include a display screen 146, a keyboard 148, a mouse 150, a stack light 152 with a variety of different (e.g., color, shape, size, etc.) lights that may be illuminated in various ways (e.g., based on one or more received signals), and a vibration device 154 that may provide vibration feedback in various ways/patterns (e.g., based on one or more received signals).

In some examples, the computing UI devices 144 may be in (e.g., wired and/or wireless) communication with the computing device 142. In some examples, the display screen 146 may be a touch screen. In some examples, the display screen 146 may include one or more speakers and/or microphones. While shown as a desktop computer in the example of FIG. 1, in some examples, the computing device 142 may instead be some other appropriate computational apparatus, such as, for example, a laptop computer, a tablet computer, smart phone, other mobile device, and/or a web server. Though shown as being physically connected to the welding-type equipment 106 via a wire cable, in some examples, the computing device 142 may be in wireless communication with the welding-type equipment 106 (and/or welding helmet 104). While shown as a separate and distinct entity in the example of FIG. 1, in some examples, the computing system 108 may be implemented via the welding-type equipment 106, welding helmet 104, and/or a sensor module 200 (discussed below with respect to FIGS. 2*a*-2*b*).

Figures 2A, 2B:
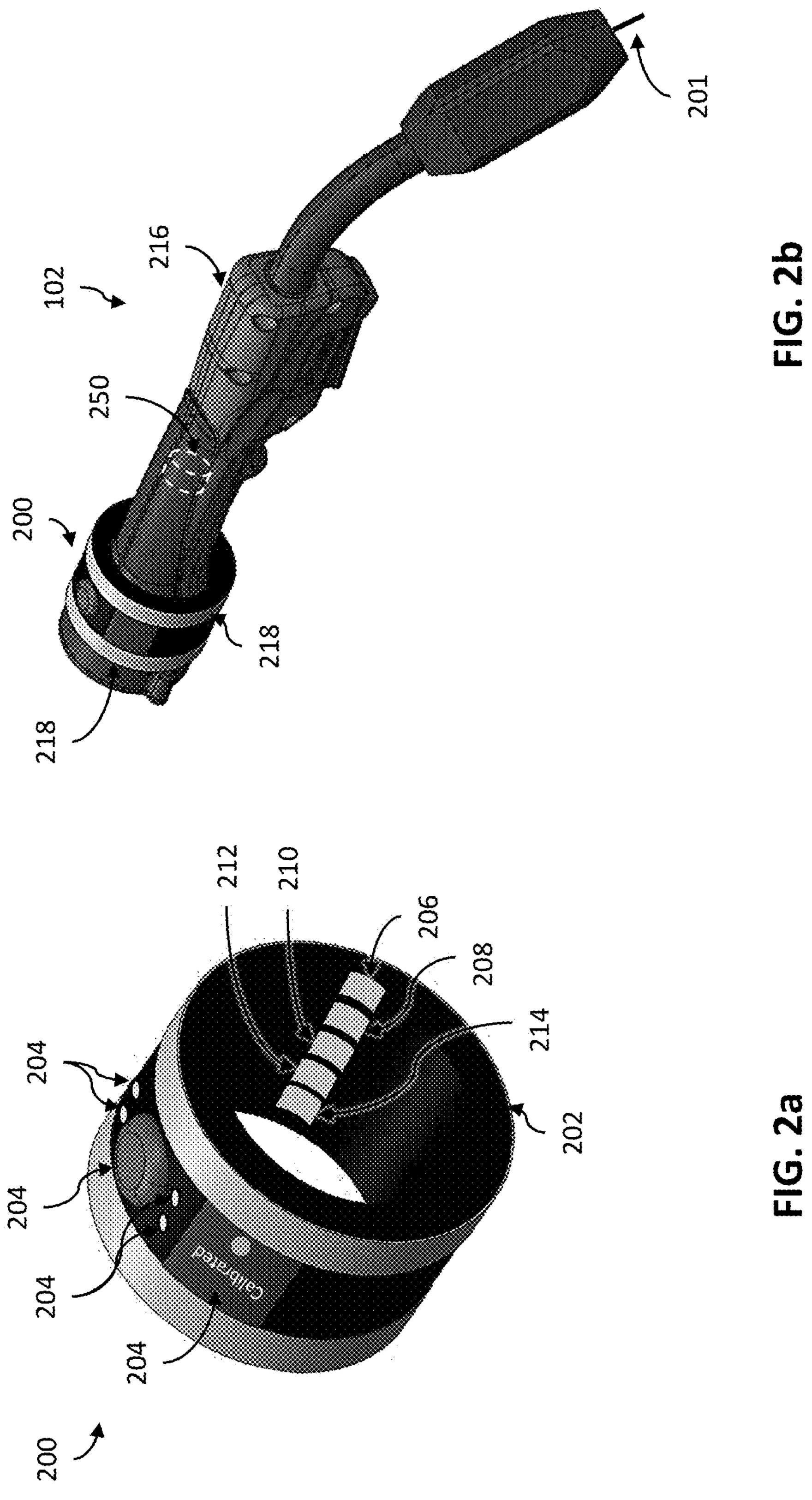
FIG. 2*a* shows an example of sensor module, in accordance with aspects of this disclosure.
FIG. 2*b* shows the example sensor module of FIG. 2*a* attached to a welding-type tool of the welding system of FIG. 1, in accordance with aspects of this disclosure.

FIGS. 2*a*-2*b* show enlarged views of an example sensor module 200. In the example of FIG. 2*a*, the sensor module 200 has an annular module housing 202 on which is disposed several module input/output (I/O) devices 204. In some examples, the module I/O devices 204 include one or more knobs, buttons, levers, switches, (e.g., touch) display screens, microphones, speakers, haptic devices, lights (e.g., LEDs), and/or other appropriate I/O devices. While some module I/O devices 204 are shown on the module housing 202 in the example of FIG. 2*a*, in some examples, other module I/O devices 204 may be disposed within the module housing 202.

In the example of FIG. 2*a*, the sensor module 200 includes module circuitry 212 and a module power supply 214 disposed within the module housing (discussed further below with respect to FIG. 3). As shown, the sensor module 200 also has an inertial measurement unit (IMU) 206, a current sensor 208, and other sensors 210 (e.g., a camera and/or optical sensors) disposed within the module housing 202. While one IMU 206 and one current sensor 208 is shown in the example of FIG. 2*a*, in some examples the sensor module 200 may include multiple IMUs 206 and/or current sensors 208.

In some examples, the current sensor 208 may be a Hall Effect sensor configured to detect when current is flowing to the welding-type tool 102 (e.g., through the hollow center of the annular module housing 202). In some examples, the current sensor 208 may alternatively, or additionally, physically connect to the conductor(s) carrying current from the welding-type equipment 106 to the welding-type tool 102 (e.g., through the welding cable 124), and/or through the welding-type tool 102 to an electrode 201 at the end of the welding-type tool 102 (see, e.g., FIG. 2*b*). In some examples, the current sensor 208 may alternatively, or additionally, physically connect to the conductor(s) carrying the trigger signal(s) from the welding-type tool 102 to the welding-type equipment 106. In some examples, the other sensors 210 may include one or more electromagnetic field (EMF) sensors, thermal sensors, acoustic sensors, optical sensors, ultrasonic sensors, and/or other appropriate sensors.

In some examples, the IMU 206 may include one or more accelerometers, gyroscopes, and/or magnetometers (e.g., compasses). In some examples, the accelerometer(s) of the IMU 206 may detect the direction(s) and/or magnitude(s) of linear acceleration(s) experienced by the sensor module 200 along all 3 axes (e.g., due to gravity, movement, etc.). In some examples, the majority of the measured acceleration will be due to the force of gravity during the relatively slow motions associated with welding-type operations.

In some examples, the gyroscope(s) and/or accelerometer(s) of the IMU 206 may detect and/or measure angular motions and/or angular velocities of the sensor module 200 about all three axes. In some examples, measurements of the gyroscope(s) and/or accelerometer(s) may be integrated over time to yield absolute yaw, pitch, and/or roll angles.

In some examples, the magnetometer is used to increase the stability and accuracy of rotation measurements about a gravity vector. In some examples, data from the magnetometer(s) may be considered unreliable and/or ignored when an EMF sensor detects a significant electromagnetic field (e.g., with strength above a threshold), when the current sensor 208 detects a current above a threshold, and/or when there is some other indication (e.g., from the welding-type tool 102, welding-type equipment 106, helmet sensor(s) 115, etc.) that a (e.g., live) welding-type operation is occurring. In some examples, the magnetometer may be manually (e.g., using I/O devices 204), and/or automatically, disabled when the data from the magnetometer(s) becomes unreliable, when a welding-type operation is occurring nearby, and/or when there is a substantial electromagnetic field nearby.

In some examples, data from the gyroscope(s), accelerometer(s), and/or magnetometer may be combined using a sensor fusion technique (e.g., Complementary Filter, Kalman Filter, etc.) to yield accurate linear and/or angular motion data. In some examples where multiple IMUs 206 are used, the data from the IMUs 206 (and/or information derived from the data) may be combined (e.g., averaged) to increase accuracy and/or alleviate the negative impact of drift. In some examples where multiple IMUs 206 are used, and the data of one IMU 206 (and/or its sensor(s)) drifts more than a threshold relative to the data of the other IMUs 206 (and/or their sensor(s)), the drifting IMU 206 (and/or its sensor(s)) may be ignored, and the sensor module 200 may continue to operate using the other IMUs 206. In some examples, the sensor module 200 may track a movement and/or orientation of the welding-type tool 102 using the detections and/or measurements of the accelerometer(s), gyroscope(s), and/or magnetometer(s) of the IMU(s) 206.

In the example of FIG. 2*b*, the sensor module 200 is shown attached to a rear portion of a handle 216 of the welding-type tool 102. More particularly, the sensor module 200 is secured to the handle 216 of the welding-type tool 102 by hose clamps 218. In some examples, other mechanisms may instead, or additionally, be used to secure the sensor module 200 to the welding-type tool 102, such as, for example, hook and loop fasteners, adhesive, screws, bolts, clamps, and/or other appropriate mechanisms. FIG. 2*b* also shows a sensor module 250 (e.g., similar to the sensor module 200) integrated into, rather than attached to, the handle 216 of the welding-type tool 102.

Figure 3:
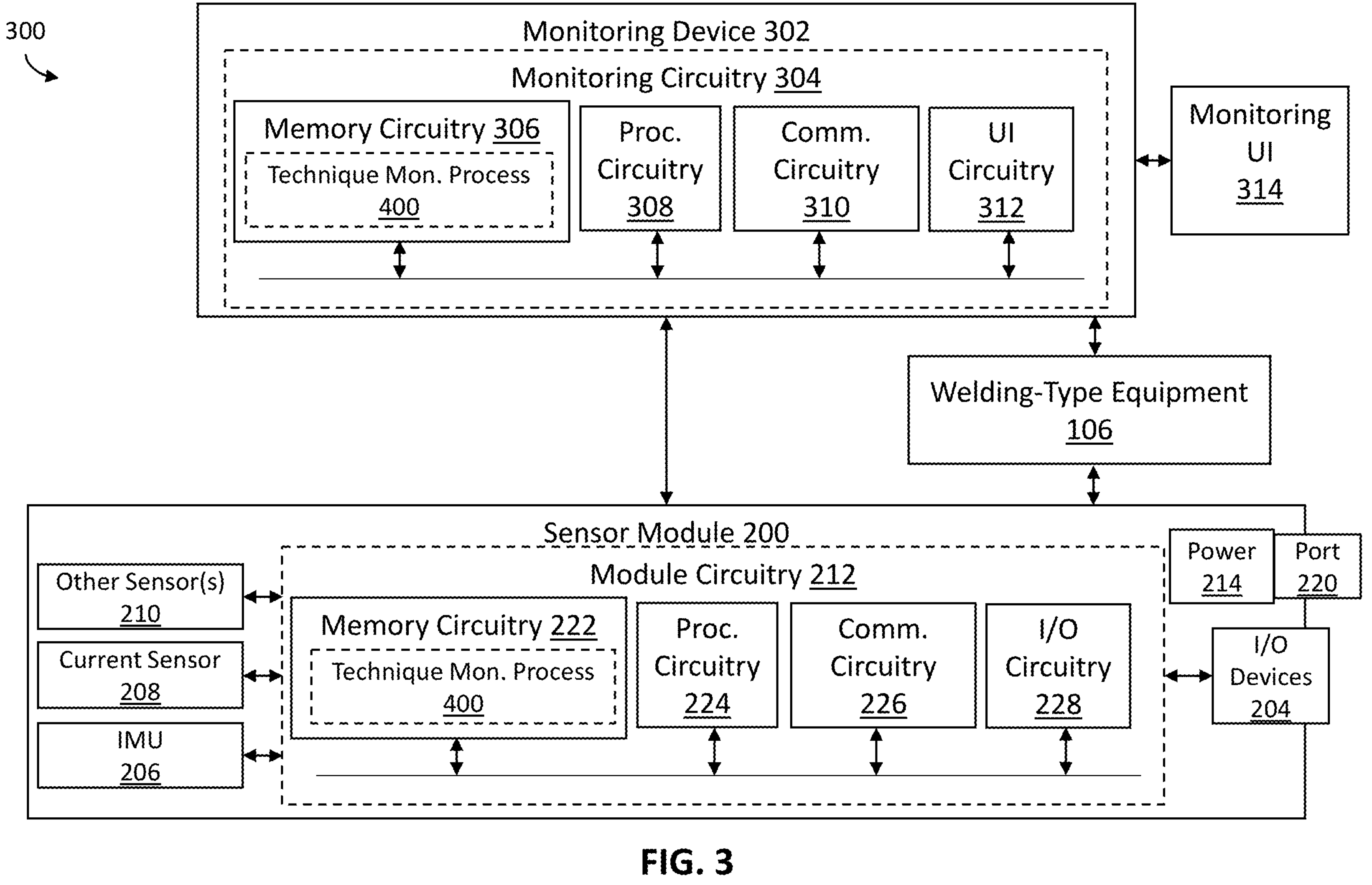
FIG. 3 is a block diagram showing an example welding technique monitoring system, in accordance with aspects of this disclosure.

FIG. 3 is a block diagram showing an example welding technique monitoring system 300. As shown, the welding technique monitoring system 300 includes a monitoring device 302, the sensor module 200, and the welding-type equipment 106, in communication with one another. While shown as a separate entity in the example of FIG. 3, in some examples, some or all of the monitoring device 302 may be implemented by the sensor module 200 and/or welding-type equipment 106. In some examples, some or all of the monitoring device 302 may be implemented by the computing device 142 and/or welding helmet 104.

In the example of FIG. 3, the monitoring device 302 includes monitoring circuitry 304. As shown, the monitoring circuitry 304 includes monitoring memory circuitry 306, monitoring processing circuitry 308, monitoring communication circuitry 310, and monitoring UI circuitry 312 interconnected with one another via a common electrical bus. In the example of FIG. 3, the welding technique monitoring system 300 also includes a monitoring UI 314 in communication with monitoring device 302. In some examples, the monitoring UI 314 may be implemented by the computing UI devices 144, helmet UI devices 114, operator interface 138 of the welding-type equipment 106, and/or module I/O devices 204 of the sensor module 200.

In the example of FIG. 3, the sensor module 200 includes the module I/O devices 204, IMU 206, current sensor 208, other sensors 210, module circuitry 212, and module power supply 214. As shown, the module power supply 214 is connected to a power port 220. In some examples, the module power supply 214 may receive external power via the power port 220 (e.g., via a power cord connected to the power port 220). While not shown for the sake of simplicity, in some examples, the module power supply 214 may be electrically connected (and/or provide power to) to the module I/O devices 204, IMU 206, current sensor 208, other sensors 210, and/or module circuitry 212.

In the example of FIG. 3, the module circuitry 212 includes module memory circuitry 222, module processing circuitry 224, module communication circuitry 226, and module I/O circuitry 228 interconnected with one another via a common electrical bus. As shown, the module circuitry 212 is in electrical communication with the module I/O devices 204, IMU 206, current sensor 208, and other sensors 210. While shown as separate, in some examples, some or all of the module circuitry 212 (or additional module circuitry 212) may be part of the IMU 206, current sensor 208, and/or other sensors 210.

In some examples, the monitoring UI circuitry 312 and/or module I/O circuitry 228 may comprise one or more drivers for the monitoring UI 314 and/or module I/O devices, respectively. In some examples, the monitoring UI circuitry 312 and/or module I/O circuitry 228 may be configured to generate one or more signals representative of input received via the monitoring UI 314 and/or module I/O devices, respectively, and provide the signal(s) to the bus. In some examples, the monitoring UI circuitry 312 and/or module I/O circuitry 228 may also be configured to control the monitoring UI 314 and/or module I/O devices, respectively, to generate one or more outputs in response to one or more signals (e.g., received via the bus).

In some examples, the monitoring communication circuitry 310 and/or module communication circuitry 226 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the monitoring communication circuitry 310 and/or module communication circuitry 226 may be configured to facilitate communication via one or more wired media and/or protocols (e.g., Ethernet cable(s), universal serial bus cable(s), etc.) and/or wireless mediums and/or protocols (e.g., cellular communication, general packet radio service (GPRS), near field communication (NFC), ultra high frequency radio waves (commonly known as Bluetooth), IEEE 802.11x, Zigbee, HART, LTE, Z-Wave, WirelessHD, WiGig, etc.). In some examples, the monitoring communication circuitry 310 and/or module communication circuitry 226 may be coupled to one or more antennas to facilitate wireless communication.

In some examples, the monitoring communication circuitry 310 and/or module communication circuitry 226 may be configured to facilitate internal and/or external communications. In some examples, the monitoring communication circuitry 310 and/or module communication circuitry 226 may receive one or more signals (e.g., from each other and/or the welding-type equipment 106) decode the signal(s), and provide the decoded data to the electrical bus. As another example, the monitoring communication circuitry 310 and/or module communication circuitry 226 may receive one or more signals from the electrical bus (e.g., representative of one or more inputs received via the monitoring UI circuitry 312 and/or I/O circuitry 308) encode the signal(s), and transmit the encoded signal(s) to an external device.

In some examples, the monitoring processing circuitry 308 and/or module processing circuitry 224 may comprise one or more processors, controllers, and/or graphical processing units (GPUs). In some examples, the monitoring processing circuitry 308 and/or module processing circuitry 224 may comprise counter circuitry and/or clock circuitry. In some examples, the monitoring processing circuitry 308 and/or module processing circuitry 224 may be configured to execute machine readable instructions stored in the monitoring memory circuitry 306 and/or module memory circuitry 222.

In the example of FIG. 3, the monitoring memory circuitry 306 and module memory circuitry 222 includes (and/or stores) a welding technique monitoring process 400. The technique monitoring process 400 is shown as being part of (and/or stored in) both the monitoring memory circuitry 306 and module memory circuitry 222 to indicate that, in some examples, either or both the monitoring device 302 and/or sensor module 200 may perform part, or all, of the technique monitoring process 400. In the discussion below, the general term memory is sometimes used to refer to monitoring memory circuitry 306 and/or module memory circuitry 222. In the discussion below, certain items and/or information is sometimes described as being included, stored, and/or recorded in memory as a shorthand for specifying that data representative of those items and/or information is included, stored, and/or recorded in memory.

In some examples, the technique monitoring process 400 may comprise machine readable instructions stored in memory and/or configured for execution by the monitoring processing circuitry 308 and/or module processing circuitry 224. In some examples, the technique monitoring process 400 may be implemented via discrete circuitry (e.g., of the monitoring processing circuitry 308 and/or module processing circuitry 224) rather than, or in addition to, instructions stored in the monitoring memory circuitry 306 and/or module memory circuitry 222. In the discussion below, the term processing circuitry is sometimes used to refer to the monitoring processing circuitry 308 and/or module processing circuitry 224.

While not shown in the example of FIG. 3, in some examples, the monitoring memory circuitry 306 and/or module memory circuitry 222 may also include (and/or store) machine readable instructions comprising counter and/or clock programs. In some examples, the memory circuitry 306 and/or module memory circuitry 222 may also include (and/or store) one or more of the thresholds discussed herein. In some examples, the monitoring memory circuitry 306 and/or module memory circuitry 222 may also include (and/or store) values for one or more determined, target, present, and/or past parameters, such as, for example, welding parameters (e.g., voltage, current, wire feed speed, gas flow rate, etc.), welding technique parameters (e.g., work angle, travel angle, travel speed, travel direction, etc.), weave parameters (e.g., frequency, weave width, dwell time, etc.), sensor parameters (e.g., sensor orientation reference frame, tool orientation vector, etc.), joint parameters (e.g., joint orientation vector, base plate perpendicular vector, base plate surface vector, etc.), and/or operation parameters (e.g., job type/identifier(s), operator identifier(s), weld cell identifier(s), project identifier(s), welding procedure specification (WPS) information, work order information, equipment type/identifier(s), weld number information, etc.). In some examples, one or more parameters may be associated with timestamp information, one or more other parameters, and/or other information. In some examples, the technique monitoring process 400 may use and/or update one or more of the stored parameters during operation.

Figure 4:
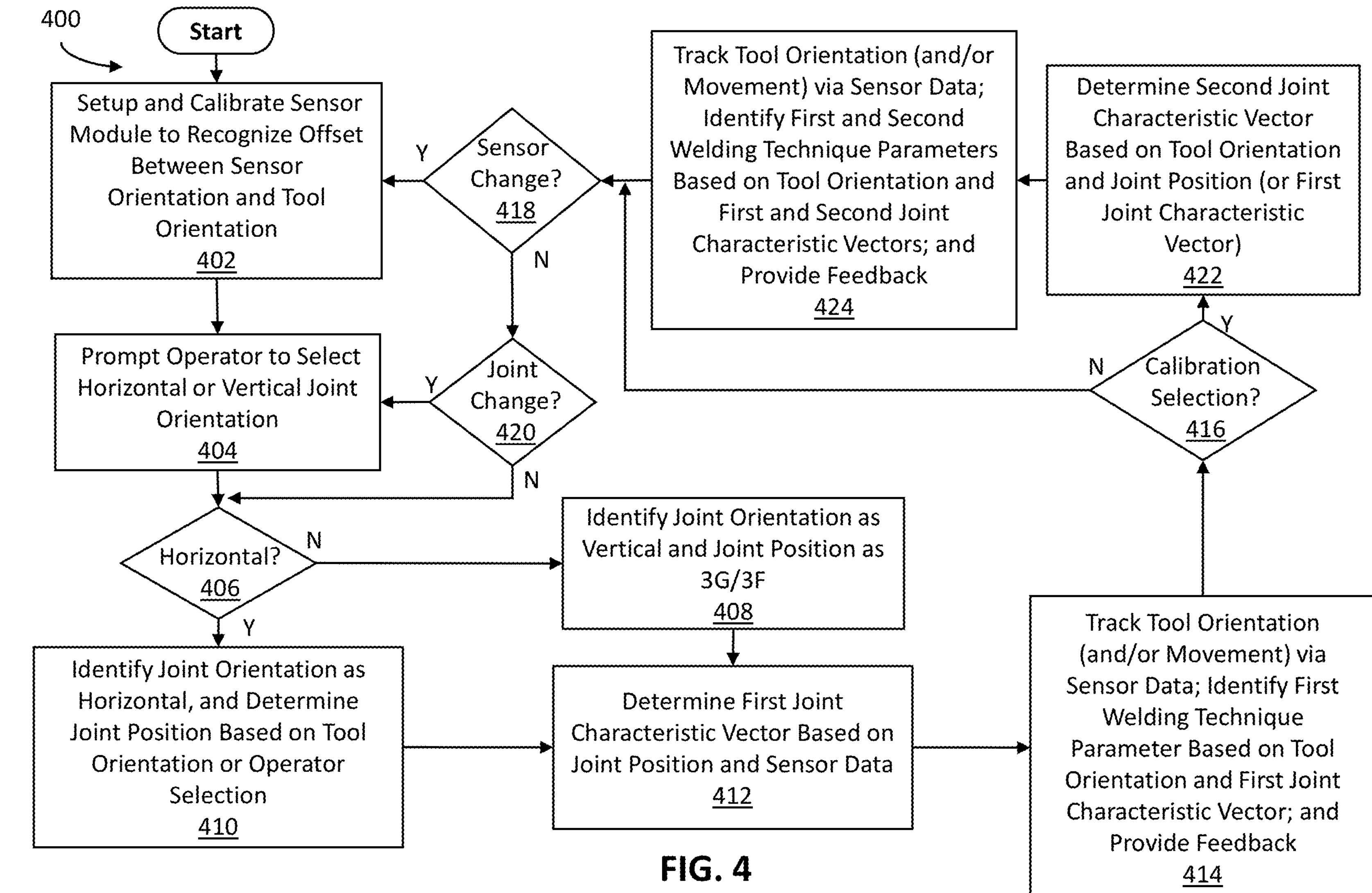
FIG. 4 is a flow diagram illustrating an example operation of a technique monitoring process of the welding technique monitoring system of FIG. 3, in accordance with aspects of this disclosure.

FIG. 4 is a flowchart illustrating operation of an example technique monitoring process 400. In some examples, during the technique monitoring process 400, the processing circuitry uses sensor data from the sensor module 200 to track an orientation of the welding-type tool 102 and/or provide real-time feedback regarding welding technique parameters based on the orientation of the welding-type tool 102. As used herein, real-time means occurring immediately while allowing for processing time, to create the impression of immediacy to a user. In some examples, during the technique monitoring process 400, the processing circuitry also uses joint characteristic information to derive the welding technique parameters. In some examples, during the technique monitoring process 400, simple calibration processes, and/or certain assumptions (e.g., based on common welding practices), may be used to obtain the joint characteristic information necessary for welding technique monitoring.

In the example of FIG. 4, the technique monitoring process 400 begins at block 402, where the processing circuitry performs certain setup procedures. In some examples, the setup procedures may include identifying certain (e.g., welding, operation, etc.) parameters at that will be used during the technique monitoring process 400. In some examples, this identification may involve input from the operator 110 (e.g., via the monitoring UI 314 and/or module I/O devices 204). In some examples, this identification may involve communication with the welding-type equipment 106. In some examples, certain parameters may be automatically identified based on other, previously identified, parameters. In some examples, the setup procedures of block 402 may include setting up, initiating, and/or calibrating the sensor module 200.

In some examples, the processing circuitry may prompt the operator 110 (e.g., via the monitoring UI 314 and/or module I/O devices 204) to setup the sensor module 200 at block 402. For example, the processing circuitry may prompt the operator 110 to attach the sensor module 200 to the welding-type tool 102 (if not already attached), and/or provide an input (e.g., via the monitoring UI 314 and/or module I/O devices 204) when the attachment is complete. As another example, the processing circuitry may prompt the operator 110 to turn on the sensor module 200 (if not already turned on), and/or provide an input (e.g., via the monitoring UI 314 and/or module I/O devices 204) when the sensor module 200 has been turned on.

In some examples, the sensor module 200 may set (or reset) an internal reference frame 502 at block 402 (see, e.g., FIG. 5*a*), and save the reference frame 502 in memory. In some examples, after the sensor module 200 sets, resets, and/or saves its reference frame 502, the sensor module 200 may track changes to its reference frame 502 using the IMU 206. For example, the gyroscope(s) and/or accelerometer(s) of the IMU 206 of the sensor module 200 may detect and/or measure angular motions of the sensor module 200 that may impact the reference frame 502 of the sensor module 200. In some examples, the sensor module 200 may continually update its reference frame 502 based on sensor data from the IMU 206 (and/or other sensors), and/or save the updated reference frame(s) 502 in memory. In such a way, the sensor module 200 may keep track of its own orientation relative to an (e.g., arbitrary) initial orientation. In some examples, the sensor module 200 may keep timestamped records of its orientation reference frame(s) 502, and/or changes to its orientation reference frame(s) 502, over time.

In some examples, the processing circuitry may additionally prompt the operator 110 (e.g., via the monitoring UI 314 and/or module I/O devices 204) to position the welding-type tool 102 in a particular (e.g., known) orientation at block 402. For example, the processing circuitry may prompt the operator 110 to position the welding-type tool 102 such that a nozzle 299 is pointing down towards the ground in a direction parallel to gravity (see, e.g., FIG. 5*b*). In such an orientation, an electrode 201 guided by the nozzle 299, and/or other structures within the nozzle 299 (e.g., a contact tip) is also pointing down towards the ground in a direction parallel to gravity. In examples where the welding-type tool 102 does not include a nozzle 299 (e.g., for stick welding and/or SMAW), the processing circuitry may prompt the operator 110 to position the welding-type tool 102 such that the electrode 201 is pointing down towards the ground in a direction parallel to gravity. In some examples, the processing circuitry may prompt the operator 110 (e.g., via the monitoring UI 314 and/or module I/O devices 204) to provide a particular input (e.g., via the monitoring UI 314 and/or module I/O devices 204) when the welding-type tool 102 is positioned in the particular (e.g., known) orientation.

Figures 5A, 5B:
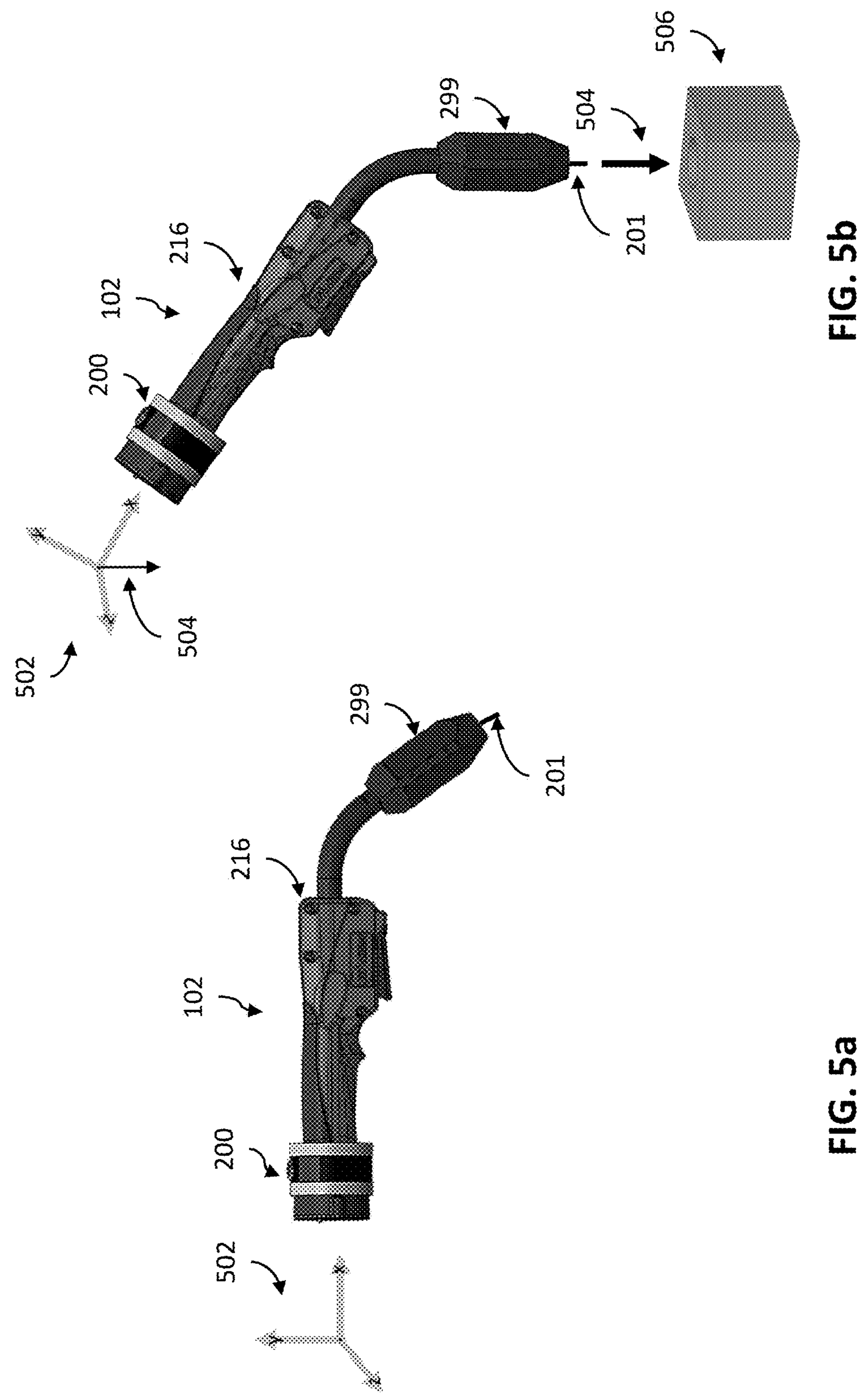
FIG. 5*a* shows an example of an initial reference frame of the sensor module of FIG. 2*a* relative to the welding-type tool of FIG. 2*b* to which the sensor module is attached, in accordance with aspects of this disclosure.
FIG. 5*b* shows an example of the welding-type tool of FIG. 2*b* in a known orientation, such as, for example, to allow a tool orientation vector to be defined relative to the reference frame of the sensor module of FIG. 2*a*, in accordance with aspects of this disclosure.

In response to input indicating the welding-type tool 102 is positioned in the particular (e.g., known) orientation, the processing circuitry may record a tool orientation vector 504 (see, e.g., FIG. 5*b*). In some examples, the tool orientation vector 504 may correspond to a direction parallel to the direction (e.g., an electrode 201 of) the welding-type tool 102 is pointing (e.g., towards a workpiece 122 and/or joint 120). In some examples, the tool orientation vector 504 may correspond to a direction parallel to a longitudinal (and/or traveling) direction of the electrode 201, such as, for example when the electrode is within and/or extending from the nozzle 299.

In some examples, the processing circuitry may record the tool orientation vector 504 relative to the reference frame 502 of the sensor module 200. For example, where the welding-type tool 102 is positioned such that the nozzle 299 (and/or electrode 201) is pointing down towards the ground in a direction parallel to gravity, the processing circuitry may record the tool orientation vector 504 as being parallel to the direction of (e.g., acceleration due to) gravity measured by the accelerometer(s) of the IMU 206. Using the recorded tool orientation vector 504, the sensor module 200 may be able to translate changes in the orientation of its own reference frame 502 (e.g., tracked via the gyroscope(s) and/or accelerometer(s) of the IMU 206) to changes in the orientation of the welding-type tool 102.

FIG. 5*a* shows an example of a reference frame 502 of the sensor module 200 at initiation. As shown, the reference frame 502 is depicted using three arrows intersecting at a point to represent the standard three coordinate axes and (e.g., 0, 0, 0) origin point. In the example of FIG. 5*a*, the reference frame 502 is depicted as being similar to a reference frame of the reader to indicate that the sensor module 200 has just been initiated and has yet to experience any change in orientation (e.g., due to movement of the welding-type tool 102).

The welding technique monitoring system 300 has no information as to the orientation of the welding-type tool 102 when the sensor module is first initiated (e.g., as shown in FIG. 5*a*). However, if an operator 110 positions the welding-type tool 102 in a particular (e.g., known) orientation and provides a corresponding input, as discussed above, the welding technique monitoring system 300 can get information as to the orientation of the welding-type tool 102. FIG. 5*b* shows an example of how the welding-type tool 102 might be positioned at block 402 so that the welding technique monitoring system 300 can get information as to the orientation of the welding-type tool 102.

In the example of FIG. 5*b*, the welding-type tool 102 is positioned with its nozzle 299 and electrode 201 pointing downwards in a direction parallel to gravity. A tool orientation vector 504 representative of this orientation is shown extending downwards from the nozzle 299 and electrode 201, also parallel to the direction of gravity. FIG. 5*b* also shows the tool orientation vector 504 extending downwards from the origin of the reference frame 502 of the sensor module 200. In some examples, the processing circuitry may record in memory the tool orientation vector 504 in relation to the reference frame 502 of the sensor module 200, and/or record some offset (and/or other information) that allows for a quick determination of the tool orientation vector 504 relative to the reference frame 502 of the sensor module 200.

In some examples, the welding-type tool 102 may be fixed and/or held in the orientation shown in FIG. 5*b* (or some other known orientation) during recordation of the tool orientation vector 504. In some examples, this may be easier if some structure is used to fix the welding-type tool in place and secure against movement. In the example of FIG. 5*b*, a calibration block 506 is shown for this purpose. As shown, the calibration block 506 is depicted below the welding-type tool 102 with a hole sized to snugly fit the nozzle 299 of the welding-type tool 102 and secure the welding-type tool 102 against movement during calibration. In some examples, some other mechanism (e.g., clamp, stand, fixture, fasteners, etc.) may be used to secure the welding-type tool 102 in proper orientation and/or minimize movement during calibration. In some examples, any of the structures described in U.S. patent application Ser. No. 15/004,801, filed Jan. 22, 2016, entitled "Manual Tool Tracking and Guidance With Inertial Measurement Unit," the contents of which are being hereby incorporated by reference in their entirety, may be used to help secure the welding-type tool 102 against movement during calibration and/or recordation of the tool orientation vector 504.

In some examples, once recorded, the tool orientation vector 504 may be used to track the orientation of the welding-type tool 102. As discussed above, the orientation of the reference frame 502 of the sensor module 200 may be tracked using the IMU(s) 206. As the tool orientation vector 504 is recorded in relation to the reference frame 502 of the sensor module 200, tracking of the orientation of the reference frame 502 may allow for tracking of the tool orientation vector 504.

The relationship between the orientation of the welding-type tool 102 and the orientation of the reference frame 502 of the sensor module 200 is exhibited in FIGS. 5*a*-5*b*. As shown, the orientation of the reference frame 502 is different in FIG. 5*a* as compared to FIG. 5*b*. In particular, the reference frame 502 in FIG. 5*b* is shown rotated clockwise with respect to the orientation of the reference frame 502 in FIG. 5*a*. The change in orientation of the reference frame 502 of the sensor module 200 between FIG. 5*a* and FIG. 5*b* is the same as the change in orientation of the welding-type tool 102 between FIG. 5*a* and FIG. 5*b*. Because the sensor module 200 is attached to the welding-type tool 102, the sensor module 200 moves in the same way, and/or rotates to the same degree, as the welding-type tool 102. This similarity of movement allows for tracking the orientation of the welding-type tool 102 (and/or the tool orientation vector 504) by tracking orientation of the sensor module 200 (and/or its reference frame 502); provided the tool orientation vector 504 is properly calibrated and/or recorded with respect to the reference frame 502 of the sensor module 200 at block 402 of the technique monitoring process 400.

In the example of FIG. 4, after block 402, the technique monitoring process 400 proceeds to block 404 where the processing circuitry prompts the operator 110 to select an orientation of the joint 120 (e.g., horizontal or vertical). In some examples, joint orientation information (in addition to tool orientation information) is needed to determine certain welding technique parameters. For example, both an orientation of the welding-type tool 102 and an orientation of the joint 120 is required to determine travel angle. As another example, both the orientation of the welding-type tool 102 and an orientation of a base plate workpiece 122 (or a vector perpendicular to the base plate workpiece 122) is needed to determine work angle. Thus, the technique monitoring process 400 seeks joint orientation information from the operator 110 at block 404. In some examples, the operator 110 may be prompted to select an orientation of the joint 120, and/or respond to the prompt(s), using the monitoring UI 314 and/or module I/O devices 204.

In some examples, the processing circuitry may assume the orientation of the joint 120 corresponds to a default joint orientation, unless/until an operator 110 selects a different orientation. For example, the memory may store a default joint orientation that the processing circuitry accesses at block 404 (or 402) and uses as the "selected" orientation of the joint 120, unless/until an operator 110 selects a different orientation (e.g., in response to the prompt(s) discussed above). In some examples, the default joint orientation may be a horizontal orientation, since horizontal orientations are more common than vertical.

In some examples, the processing circuitry assumes that the joint and/or base plate is oriented parallel or perpendicular to the direction of acceleration due to gravity (which is often the case in practice). In some examples, the processing circuitry further assumes that the joint is a linear (as opposed to curved) joint. Such assumptions allow for accurate determination of joint orientation and base plate orientation (and/or orientation of a vector perpendicular to the base plate) with minimal additional calibrations (which is important since operators 110 sometimes either forget, or are reluctant, to spend time doing calibrations). Thus, in some examples, the processing circuitry may only offer the option to select a vertical or horizontal joint.

In the example of FIG. 4, after block 404, the technique monitoring process 400 proceeds to block 406 where the processing circuitry decides to either proceed to block 408 or block 410, depending on whether the joint orientation selected at block 404 is vertical or horizontal. Where the selected joint orientation is vertical, the technique monitoring process 400 proceeds to block 408. At block 408, the processing circuitry determines that the joint is in a 3G or 3F joint position (those being the only two joint positions possible for vertical joints). Where the selected joint orientation is horizontal the technique monitoring process 400 instead proceeds from block 406 to block 410, where the processing circuitry seeks additional information to determine the joint position.

At block 410, the processing circuitry determines a horizontal joint position of the joint 120. In some examples, the determination may be based on input from the operator 110 (e.g., via monitoring UI 314 and/or module I/O devices 204). In some examples, the processing circuitry may use data received from the sensor module 200 to determine the horizontal joint position.

In some examples, the processing circuitry may use data from the sensor module 200 to identify the real time orientation of the welding-type tool 102 in relation to gravity, and use that relative orientation to determine the horizontal joint position. For example, the processing circuitry may determine the acceleration due to (and/or direction of) gravity relative to the current reference frame 502 of the sensor module 200 using the accelerometer(s) of the IMU 206 of the sensor module 200. The processing circuitry may further identify the orientation of the welding-type tool 102 relative to the current reference frame 502 of the sensor module 200 using the recorded tool orientation vector 504. Thereafter, the processing circuitry can determine an angle between the tool orientation vector 504 and a gravity vector 602 corresponding to the measured direction of the acceleration of gravity (see, e.g., FIG. 6). In some examples, different horizontal joint positions may correspond to different angles between the tool orientation vector 504 and the gravity vector 602, and the processing circuitry may thereby automatically determine the horizontal joint position using the determined angle.

Figure 6:
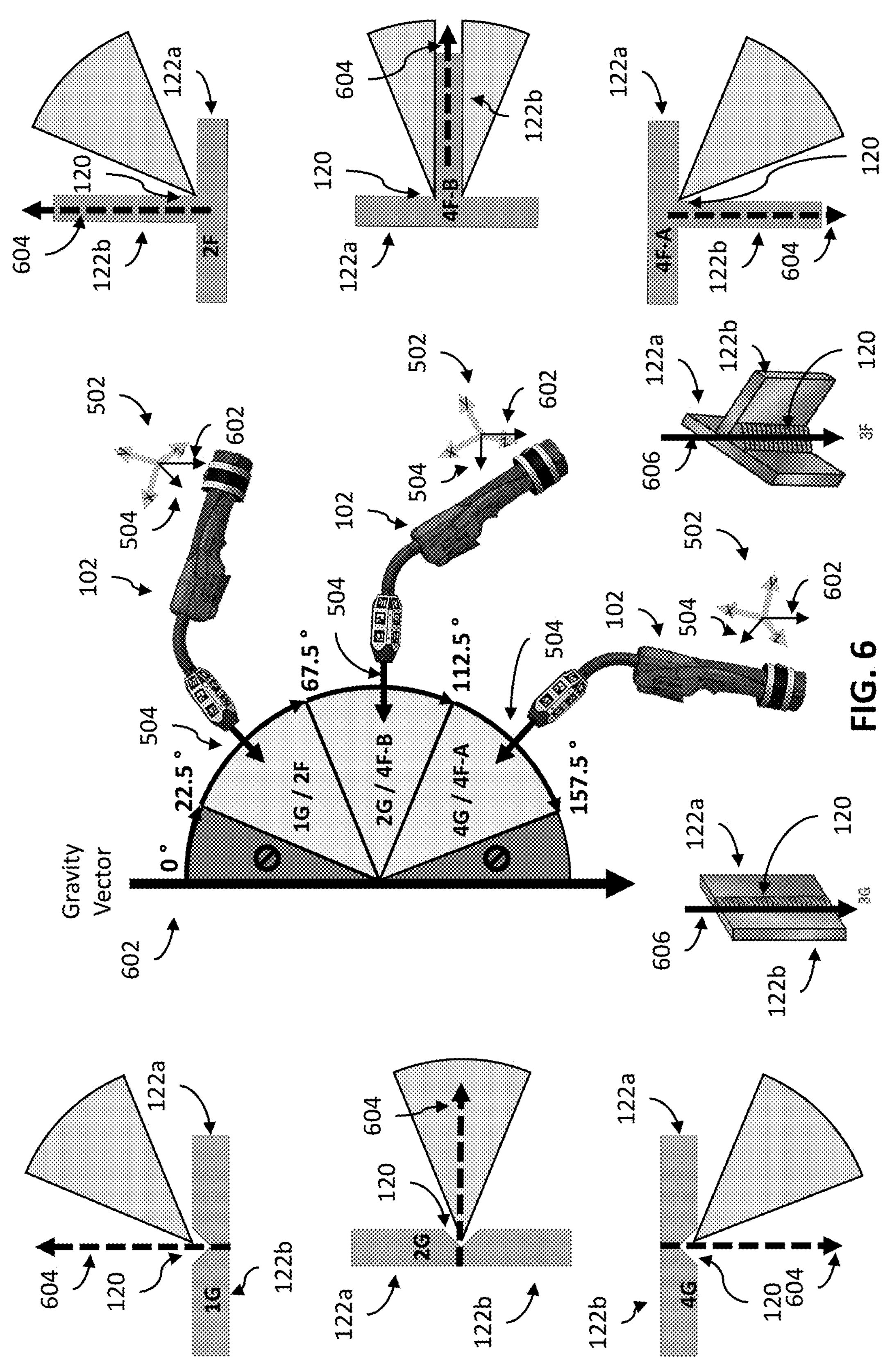
FIG. 6 is a diagram showing an example of how the technique monitoring process of FIG. 4 might automatically determine a horizontal joint position using sensor data of the sensor module of FIG. 2*a*, in accordance with aspects of this disclosure.

FIG. 6 is a diagram showing example angles that might occur between the tool orientation vector 504 and the gravity vector 602, and how those angles might correspond to different horizontal joint positions. In the example of FIG. 6, examples of joints 120 for two main types of welds (fillet and groove) are shown in different welding positions. In particular, six different example horizontal joint positions are shown: 1G, 2G, 2F, 4F-A, 4F-B, and 4G. The joint 120 is shown going into the page at all six positions. However, the orientation of the base plate workpiece 122*a*, and/or the orientation of a vector 604 extending perpendicular to the base plate workpiece 122*a*, varies. As the base plate perpendicular vector 604 is needed to determine certain welding technique parameters (i.e., work angle), it can be important for the technique monitoring process 400 to establish the particular horizontal position of the joint 120.

In the example of FIG. 6, the 1G, 2G, and 4G joint positions correspond to groove weld joints 120 between two workpieces 122 (e.g., butt joints). The 1G joint position is a groove weld in a flat position. The 2G joint position is a groove weld in a horizontal position. The 4G joint position is a groove weld in an overhead position. In some examples, either workpiece 122 may be considered the base plate workpiece 122 for the 1G, 2G, and 4G joint positions.

In the example of FIG. 6, the 2F, 4F-A, and 4F-B joints positions correspond to fillet weld joints 120 between two workpieces 122 (e.g., T joints). The 4F-A joint position is a fillet weld in a first overhead position. The 4F-B joint position is a fillet weld in a second overhead position. The 2F joint position is a fillet weld in a horizontal position. In some examples, the workpiece 122*a* is the base plate workpiece 122*a* for the 2F, 4F-A, and 4F-B joints positions.

In the example of FIG. 6, the base plate perpendicular vector 604 is the same (i.e., straight up, parallel to the direction of gravity) for both the 1G and 2F joint positions. Likewise, the base plate perpendicular vector 604 would be the same (i.e., straight down, parallel to the direction of gravity) for both the 4G and 4F-A joints positions. The base plate perpendicular vector 604 would be the same for both the 2G and 4F-B joint positions (i.e., horizontal, perpendicular to the direction of gravity in a plane containing both the gravity vector 602 and tool orientation vector 504). In some examples, for the 2G and 4F-B joint positions, a base plate perpendicular vector 604 that is parallel to gravity may still be used to determine the relevant welding technique parameter(s) (e.g., travel angle), and simply modified (e.g., via addition/subtraction) by ninety degrees to account for the difference.

In the example of FIGS. 6, a 22.5-67.5 degree angle between the gravity vector 602 and tool orientation vector 504 corresponds to the 1G and/or 2F position (and/or the corresponding base plate perpendicular vector 604). As shown, a 67.5-112.5 degree angle between the gravity vector 602 and tool orientation vector 504 corresponds to the 2G and/or 4F-B position (and/or the corresponding base plate perpendicular vector 604). A 112.5-157.5 degree angle between the gravity vector 602 and tool orientation vector 504 is shown corresponding to the 4G and/or 4F-A position (and/or the corresponding base plate perpendicular vector 604).

In some examples, the processing circuitry may be unable to automatically determine the horizontal joint position. For example, where the angle between the gravity vector 602 and tool orientation vector 504 is too small (or too large), the resulting cross product between the two vectors may become highly uncertain, and/or very small variations in measurement (e.g., noise) may have a significantly amplified impact on the cross product, such that the processing circuitry may be unable (or decline) to automatically determine the horizontal joint position based on the angle. In the example of FIG. 6, this situation is depicted where the angle is 0-22.5 degrees and/or 157.5-180 degrees. In some examples, the processing circuitry may provide a notification (e.g., via the monitoring UI 314 and/or Module I/O devices 204) informing the operator 110 if the horizontal position could not be automatically detected. In some examples, the processing circuitry may repeat block 410 of the technique monitoring process 400 if unable to automatically determine the horizontal joint position.

In the example of FIG. 4, after block 408 and/or block 410, the technique monitoring process 400 proceeds to block 412 where the processing circuitry determines a first joint characteristic vector. In some examples, the first joint characteristic vector may be determined based on data from the sensor module 200 as well as the joint position identified at block 408 or block 410.

In some examples, the first joint characteristic vector may be a joint orientation vector 606 (see, e.g., FIG. 6). For example, where the joint position is a (e.g., 3F or 3G) vertical joint position (e.g., identified at block 408; see, e.g., FIG. 6), the processing circuitry may determine that the joint orientation vector 606 is parallel to (and/or the same as) the gravity vector 602. In some examples, the first joint characteristic vector may be a base plate perpendicular vector 604. For example, where the joint position is a (e.g., 1G, 2G, 2F, 4F-A, 4F-B, or 4G) horizontal joint position (e.g., identified at block 410), the processing circuitry may determine the base plate perpendicular vector 604 automatically (e.g., based on angle) or based on user selection, as discussed above. This is possible because, again, certain assumptions are made based on common welding practices, to simplify the calibration process of the technique monitoring process 400.

In some examples, the processing circuitry may be able to determine either the joint orientation vector 606 or the base plate perpendicular vector 604 at block 412, but not both. Nevertheless, being able to determine only one or the other may still allow the processing circuitry to determine some real time welding technique parameter values, and/or provide some feedback to the operator 110, which can be valuable.

In the example of FIG. 4, after block 412 the technique monitoring process 400 proceeds to block 414 where the processing circuitry tracks the orientation and/or movement of the welding-type tool 102 using data from the sensor module 200, identifies one or more welding technique parameters, and/or provides appropriate feedback. In some examples, the rotational orientation of the welding-type tool 102 may be tracked in real time using the sensor reference frame 502, tool orientation vector 504, and IMU 206, as discussed above. In some examples, the linear movements (e.g., speed and direction) of the welding-type tool 102 may also be tracked by analyzing linear acceleration measurements of the accelerometer(s) of the IMU 206. In some examples, movement of the welding-type tool 102 in a plane defined by the joint orientation vector 606 and a base plate surface vector 802 (e.g., perpendicular to both the joint orientation vector 606 and base plate perpendicular vector 604; see, e.g., FIGS. 8*a*-9*b*) may be analyzed to determine weave pattern characteristics (e.g., frequency, weave width, dwell time, etc.).

In some examples, movement in a direction parallel to the joint orientation vector 606 may be assumed to be in a correct direction. Thus, in some examples, if the joint orientation vector 606 is known, speed of movement in a direction parallel to the joint orientation vector 606 may be considered travel speed. In some examples, a separate calibration procedure may be used to inform the processing circuitry of the correct travel direction. For example, the tool orientation vector 504 may be oriented along the correct direction of travel and an input provided (e.g., via the monitoring UI 314 and/or module I/O devices 204). As another example, the welding-type tool 102 may be moved in the correct direction during an identified calibration time duration (e.g., while a calibration input is held down, or pressed at start/end). As another example, a simple input may be provided (e.g., via the monitoring UI 314 and/or module I/O devices 204) indicating that the travel direction is up, down, left, or right (e.g., from the perspective of the operator 110).

In some examples, real time welding technique parameters may be determined at block 414 based on the tracked orientation(s) and/or movement(s) of the welding-type tool 102. For example, where the joint orientation vector 606 is known, travel angle can be determined. In some examples, travel angle may be defined as the angle of the welding-type tool 102 with respect to a direction that a welding-type operation progresses (e.g., where a perpendicular angle is a zero degree travel angle). Thus, in some examples, the technique monitoring process 400 may determine the travel angle based on the angle between the joint orientation vector 606 and the tool orientation vector 504 (and/or 90 degrees minus this angle).

As another example, where the base plate perpendicular vector 604 is known, work angle can be determined. In some examples, work angle may be defined as the angle between a line perpendicular to the major workpiece (e.g., base plate workpiece 122*a*) and a plane determined by the electrode axis (e.g., tool orientation vector 504) and the weld axis (e.g., joint orientation vector 606). Thus, in some examples, the technique monitoring process 400 may determine the work angle based on the base plate perpendicular vector 604 and the tool orientation vector 504 (e.g., where the tool orientation vector 504 is assumed to be the relevant line on the plane). In examples where travel angle is determined, the technique monitoring process 400 may use the travel direction in conjunction with travel angle to determine whether welding-type operation is a push or drag operation (e.g., based on whether tool orientation vector 504 and travel direction are in the same, or a different, direction). In some examples, a positive travel angle may be considered a push, while a negative travel angle is considered a drag.

In some examples, the processing circuitry may further provide real time feedback at block 414. In some examples, the real time feedback may be provided to the operator 110 via the monitoring UI 314 and/or module I/O devices 204. In some examples, the feedback may be in the form of one or more text messages, images, videos, sounds, vibrations, and/or appropriate outputs. In some examples, the feedback may identify one or more of the welding technique parameter values and/or weave pattern characteristics determined at block 414. In some examples, the feedback may identify one or more welding, sensor, and/or operation parameter values.

In some examples, the feedback may be with respect to that particular instantaneous moment in time, and/or with respect to a given time period. In some examples, the processing circuitry may compare the determined parameter values (and/or weave pattern characteristic values) to expected and/or target welding technique parameter (and/or weave pattern characteristic) values, and/or provide feedback regarding the comparison. In some examples, the technique monitoring process 400 might provide different feedback (e.g., red vs. green colors, chime vs. alarm sounds, etc.) depending on whether the determined values are within, or outside of, a threshold range of the expected/target values. In some examples, the processing circuitry may further determine one or more ratings, grades, and/or scores based on the comparison of the determined values to the expected/target values, and provide feedback with respect thereto.

In some examples, the processing circuitry may further record in memory and/or transmit (e.g., to a remote server) parameter/characteristic values, and/or relative feedback. For example, the processing circuitry may send the information to the welding equipment 106. In some examples, the welding equipment 106 may use the information to adjust welding parameters. In some examples, the processing circuitry may disable the welding equipment 106, send a message to a supervisor, lock the workpiece(s) 122 (e.g., via a clamp or fixture), and/or take other appropriate action in response to a technique grade, rating, and/or score below a threshold (e.g., stored in memory).

In some examples, the processing circuitry may further track when a (e.g., live or simulated) welding-type operation is occurring (e.g., via measurements of the current sensor 208, communication with the welding helmet 104, and/or communication with welding equipment 106) and use this information when determining parameter/characteristic values. For example, the processing circuitry may only determine technique data and/or weave pattern characteristics when a welding-type operation is occurring. As another example, the processing circuitry may only provide feedback and/or determine a grade, rating, and/or score when an actual (or simulated) welding-type operation is occurring. As another example, the processing circuitry may record and/or output information about whether the welding-type operation is occurring when recording and/or outputting the technique data and/or weave pattern characteristics (and/or associated feedback).

In some examples, the processing circuitry may be able to continuously provide real time determination and feedback of at least some welding parameter values at block 414. In the example of FIG. 4, if there is no repositioning of, and/or changes to, the sensor module 200 (e.g., at block 418) and/or joint 120 (e.g., block 420), the technique monitoring process 400 may loop back to block 414 and the processing circuitry may continue to provide feedback as to at least some welding parameter values. While there are some drawbacks and limitations, there is still value in being able to provide feedback with only the minimal and simple calibrations of blocks 402 and 404, without requiring more from the operator 110 (who may forget and/or be reluctant to do so).

However, there may be some drawbacks and/or limitations. For example, being able to determine either the joint orientation vector 606 and base plate perpendicular vector 604 at block 412, but not both, may result in only being able to determine (and/or provide feedback with respect to) either the travel angle or work angle at block 414, but not both. Furthermore, while the travel angle or work angle may be estimated with some degree of accuracy at block 414 (e.g., using some assumptions), more precise travel angle or work angle calculations may require both the joint orientation vector 606 and the base plate perpendicular vector 604. For example, precise calculations of travel angle and/or work angle may rely on both an angle between the tool orientation vector 504 and the joint orientation vector 606, and an angle between the tool orientation vector 504 and the base plate perpendicular vector 604 (e.g., applied to certain trigonometric functions). Additionally, in some examples, the real time automatic determination of horizontal joint position at block 410 may rely on the operator 110 continuously holding the welding-type tool 102 within a range of particular angles (e.g., as discussed with respect to block 410 and FIG. 6) which, while ideal for the envisioned joint positions, may not occur in practice.

As another example, the determinations at block 414 of the technique monitoring process 400 may become increasingly unreliable as conditions deviate from ideal circumstances. For example, in the absence of a second joint characteristic vector, the determination of weld angle and/or travel angle may become increasingly unreliable as the tool orientation vector 504 deviates farther from a perpendicular relationship with the joint orientation vector 606 (for horizontal joint positons) or base plate surface vector 802 (for vertical joint positions). This can be an issue for the horizontal joint positions, or for the 3G vertical joint position, if the operator 110 deviates from common and/or ideal orientations of the welding-type tool 102. Additionally, it makes determination of travel angle (and/or work angle) very difficult for the 3F vertical joint position, because a perpendicular position is blocked by the secondary workpiece 122*b*, and the common and/or ideal orientations of the welding-type tool 102 for such a position is far from perpendicular.

Some of the above noted drawbacks and/or limitations may be alleviated through further calibration outlined by the technique monitoring process 400 at blocks 416 and 422. In the example of FIG. 4, after block 414, the technique monitoring process 400 proceeds to block 416, where the processing circuitry determines whether a calibration selection has been received. In some examples, the processing circuitry may prompt the operator 110 for such a calibration selection (e.g., via the monitoring UI 314 and/or module I/O devices 204). In some examples, the calibration selection at block 416 may indicate that the welding-type tool 102 is oriented properly for calibration.

In some examples, a proper orientation of the welding-type tool 102 may be where the electrode 201 is pointed towards the joint 120 at a ninety degree angle with respect to the joint 120 (and/or joint orientation vector 606) or the base plate workpiece 122*a* (and/or base plate surface vector 802), depending on whether the joint 120 is in a horizontal joint position or vertical joint position, respectively. In some examples, the prompt may indicate the proper orientation. In some examples, the processing circuitry may record in memory the instantaneous values (and/or representations) of the reference frame 502, gravity vector 602, and tool orientation vector 504 in response to the calibration selection. As shown, after a calibration selection at block 416, the technique monitoring process 400 proceeds to block 422.

In the example of FIG. 4, the processing circuitry determines a second joint characteristic vector at block 422. In some examples, the second joint characteristic vector may be whichever of the joint orientation vector 606 or base plate perpendicular vector 604 was not determined as the first joint characteristic vector at block 412. In some examples, the processing circuitry may further lock in the first joint characteristic, rather than leaving it variable and/or subject to the real-time determinations of the tool orientation vector 504 and gravity vector 602 (e.g., as may occur when automatically determining horizontal joint positions in block 410).

In some examples, the second joint characteristic vector may be determined based on the tool orientation vector 504 and the first joint characteristic vector (and/or the gravity vector 602). For example, for a horizontal joint position where the first joint characteristic vector is the base plate perpendicular vector 604, the processing circuitry may determine the joint orientation vector 606 to be the cross product (and/or a vector perpendicular to both) of the tool orientation vector 504 and the base plate perpendicular vector 604 (and/or the gravity vector 602). As another example, for a vertical joint position where the first joint characteristic vector is the joint orientation vector 606, the processing circuitry may determine the base plate surface vector 802 to be the cross product (and/or a vector perpendicular to both) of the tool orientation vector 504 and the joint orientation vector 606 (and/or the gravity vector 602). Thereafter, the processing circuitry may determine the base plate perpendicular vector 604 to be the cross product (and/or a vector perpendicular to both) of the base plate surface vector 802 and the joint orientation vector 606. In some examples, the processing circuitry may negate (and/or take the opposite of) a vector direction resulting from a cross product, depending on the math conventions being used.

In the example of FIG. 4, after block 422, the technique monitoring process 400 proceeds to block 424 where the processing circuitry tracks the orientation and/or movement of the welding-type tool 102 using data from the sensor module 200, identifies one or more welding technique parameters, and/or provides appropriate feedback, similar to block 414. In some examples, the tracking of the welding-type tool 102 and/or feedback of block 424 may be similar (or identical) to that of block 414. However, in some examples, the technique monitoring process 400 may be able to determine more (and/or more precise) welding technique parameter values at block 424 than at block 414 due to the availability of both the joint orientation vector 606 and base plate perpendicular vector 604 for all joint positions. In some examples, such availability may enable the technique monitoring process 400 to determine and/or provide feedback for both work angle and travel angle values, rather than just one or the other, as at block 414. Additionally, the reliability of the information is increased, and limitations reduced.

In the example of FIG. 4, the processing circuitry may continue the tracking, technique parameter calculations, and/or feedback of block 424 unless or until there is a change in the sensor module 200 (e.g., block 418) and/or the joint 120 (e.g., block 420). As shown, in the absence of such a change, the technique monitoring process 400 returns to block 406, where the processing circuitry may determine the same information still applies, eventually leading the technique monitoring process 400 back to block 424. Though not shown, in some examples, the technique monitoring process 400 may be terminated at any time by appropriate input from the operator 110.

In the example of FIG. 4, at block 418, the processing circuitry checks to see if there has been a change in the sensor module 200 that warrants recalibration. In some examples, such a change may be determined to occur if there has been more than a threshold amount drift of one or more of the sensors of the IMU 206. In some examples where multiple IMUs 206 are used, such a change may be determined to occur if there has been more than a threshold amount drift of one or more sensors of more than a threshold number of the IMUs 206. In some examples, a change warranting recalibration may be determined to occur if more than a threshold amount of time has passed since the sensor module 200 was set and/or reset at block 402 (or joint calibration performed at blocks 404 and/or 416), which might be correlated with substantial drift. As shown, the technique monitoring process 400 proceeds to block 420 after block 418.

In the example of FIG. 4, the processing circuitry checks whether there has been a significant enough change in the joint 120 to warrant recalibration at block 420. In some examples, the technique monitoring process 400 may rely on the operator 110 to provide this information (e.g., via the monitoring UI 314 and/or module I/O devices 204). For example, if the operator 110 finishes one welding-type operation, and is set to begin a different welding-type operation with one or more different workpieces 122 and/or one or more different joints 120, then the operator 110 may provide an input to let the processing circuitry know that the prior joint calibrations are no longer applicable. In such an example, the technique monitoring process 400 would begin again at block 404. However, if, for example, the operator 110 is continuing with the same welding-type operation, or even starting a new welding-type operation where the joint 120 is in the same position and oriented the same way as the previous welding-type operation, then the technique monitoring process 400 may continue with no additional calibrations necessary.

Figures 7A, 7B:
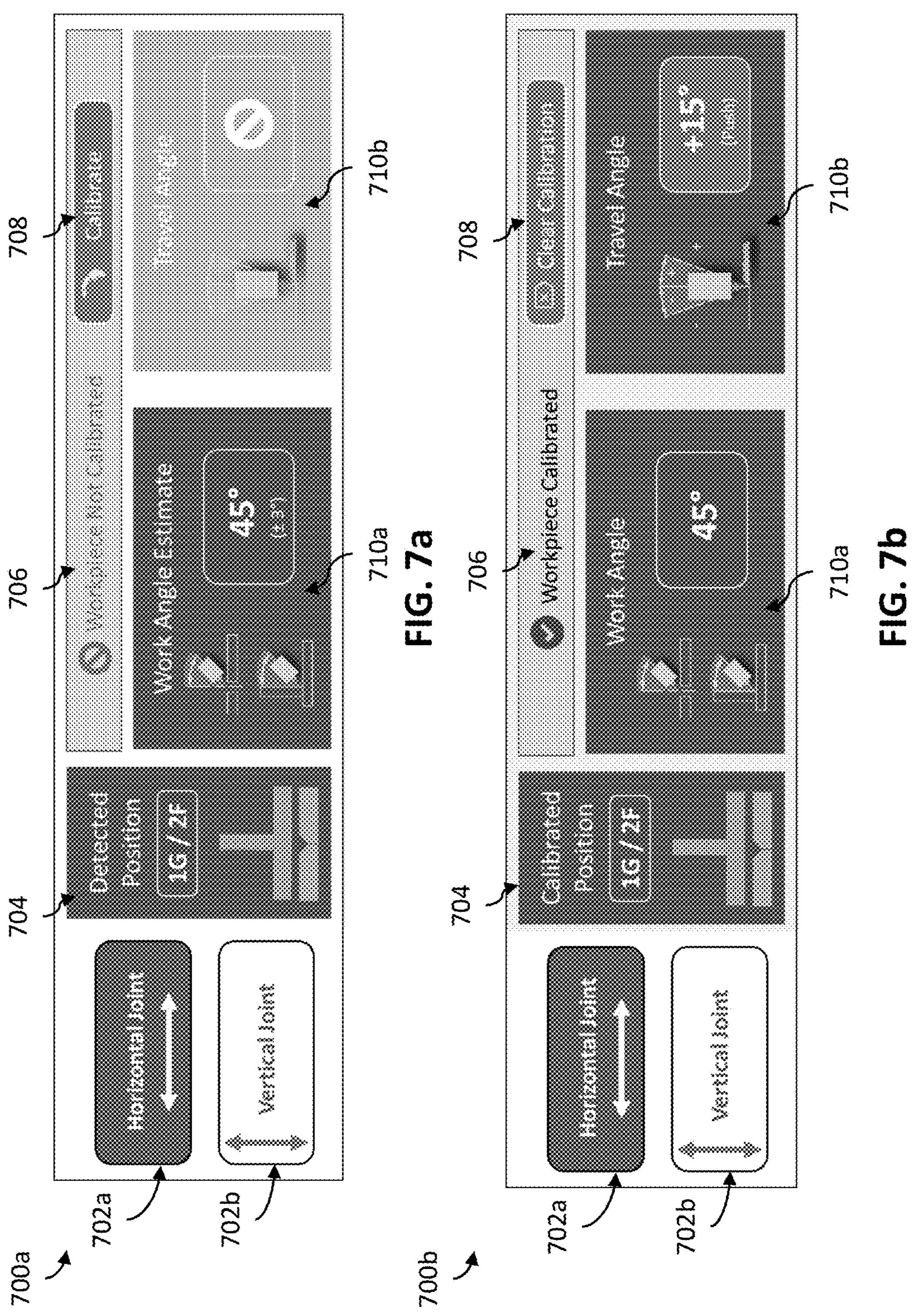
FIGS. 7*a*-7*b* show example graphical user interfaces (GUIs) that might be shown during the technique monitoring process of FIG. 4, in accordance with aspects of this disclosure.

FIGS. 7*a*-7*b* show examples of graphical user interfaces (GUIs) 700 that might be shown during the technique monitoring process 400 via the display screen(s) of the module I/O devices 204 and/or monitoring UI 314. In FIGS. 7*a*-7*b*, the GUIs 700 have input buttons 702 by which an operator 110 might select the orientation of the joint 120 (e.g., at block 404). As shown, the input button 702*a* is highlighted to show that the horizontal joint orientation has been selected.

In the examples of FIGS. 7*a*-7*b*, the GUIs 700 are additionally shown as including a joint position indicator 704. In the GUI 700*a* shown in FIG. 7*a*, the joint position indicator 704 indicates that the 1G/2F joint position has been automatically detected (e.g., via block 410). In the GUI 700*b* shown in FIG. 7*b*, the joint position indicator 704 indicates that the 1G/2F joint position has been locked in via calibration (e.g., via block 416 and/or 422). The joint position indicators 704 in both GUIs 700 further show a depiction of example workpieces in a 1G and 2F joint position.

In the example of FIGS. 7*a*-7*b*, the GUIs 700 show a calibration status message 706 next to a calibration button 708. In the GUI 700*a* of FIG. 7*a*, the calibration status message 706 indicates that full calibration has not yet been achieved. This correlates with the joint position indicator 704 in GUI 700*a* which indicates that the joint position has only been detected, rather than locked in via calibration. The calibration button 708 next to the calibration status message 706 provides a means through which an operator 110 could provide an input to induce full calibration (e.g., at block 416).

In the GUI 700*b* of FIG. 7*b*, the calibration status message 706 indicates that the welding technique monitoring system 300 has been fully calibrated to be able to recognize both joint characteristic vectors. This correlates with the joint position indicator 704 in GUI 700*b*, which indicates that the joint position has been locked in during calibration, rather than just instantaneously detected at the current point in time. The calibration button 708 next to the calibration status message 706 provides an input through which an operator 110 could clear the current calibration, such as if, for example, the operator 110 was starting a new welding-type operation with a different joint position (e.g., block 420).

While not shown, in some examples, the calibration status message 706 might also indicate a threshold amount of time had passed since calibration, indicate a time until such a threshold would pass, and/or indicate a confidence level of the feedback given the time since calibration (e.g., due to drift of the IMU 206). In some examples, the calibration button 708 may be unavailable as a means through which an operator 110 could provide an input to induce calibration (e.g., at block 416), such as for example, if the angle formed by the tool orientation vector 504 and the gravity vector 602 is too extreme. In some examples where the calibration button 708 is unavailable, the calibration button 708 may be grayed out and/or include a notification indicating why the calibration button 708 is unavailable.

In the examples of FIGS. 7*a*-7*b*, each GUI 700 provides two feedback outputs 710. In the GUI 700*a* shown in FIG. 7*a*, the feedback output 710*a* shows the current work angle estimated by the technique monitoring process 400. While the feedback output 710*b* of GUI 700*b* corresponds to the current travel angle estimated by the technique monitoring process 400, the feedback output 710*b* is shown grayed out with a prohibition symbol to indicate that the technique monitoring process 400 cannot provide feedback for this technique parameter (e.g., because the technique monitoring process 400 has not been fully calibrated). In some examples, the feedback output 710*a* might instead be grayed out were the vertical joint position indicator 704*b* instead selected.

In the GUI 700*b* shown in FIG. 7*b*, both feedback outputs 710 show values detected (rather than estimated) during the technique monitoring process 400, as made possible by full calibration during the technique monitoring process 400. Additionally, the feedback output 710*b* provides feedback that the welding-type operation is a push (rather than pull) operation.

While described as feedback outputs 710, in some examples, the feedback outputs 710 may alternatively, or additionally, be means through which input can be provided. For example, selection of the feedback outputs 710 may change the format of the feedback being output (e.g., from numerical, to chart/graph, to numerical and chart/graph, etc.). While only travel angle and weld angle are shown in the feedback outputs 710, in some examples other parameter values (and/or weave pattern characteristic values) may be shown.

Figure 8B:
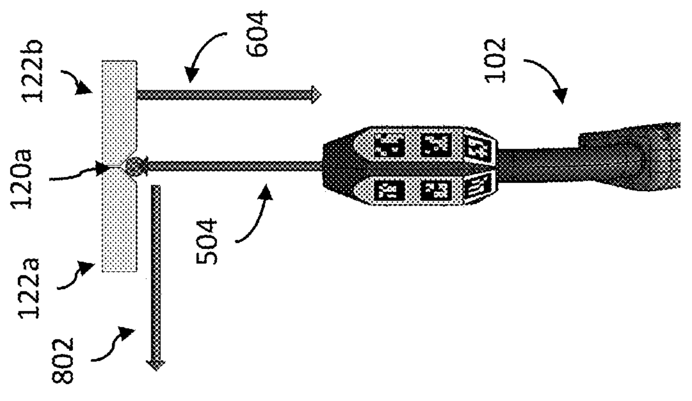
FIGS. 8*a*-8*b* show examples of a vertically oriented joint, and how several vectors that might be used during the technique monitoring process of FIG. 4 relate to the joint, in accordance with aspects of this disclosure.
Figure 8A:
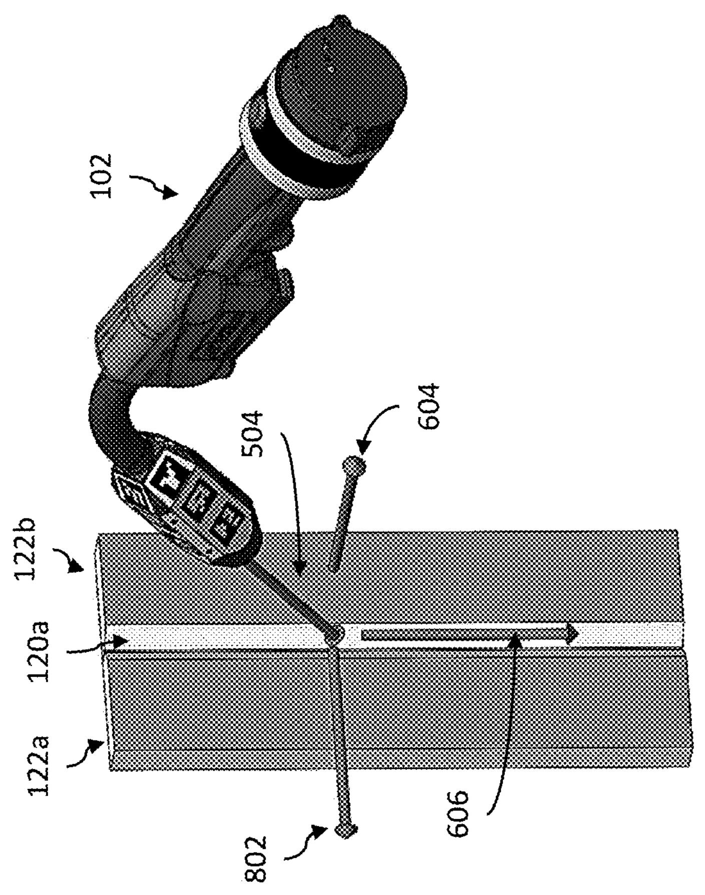
Figures 9A, 9B:
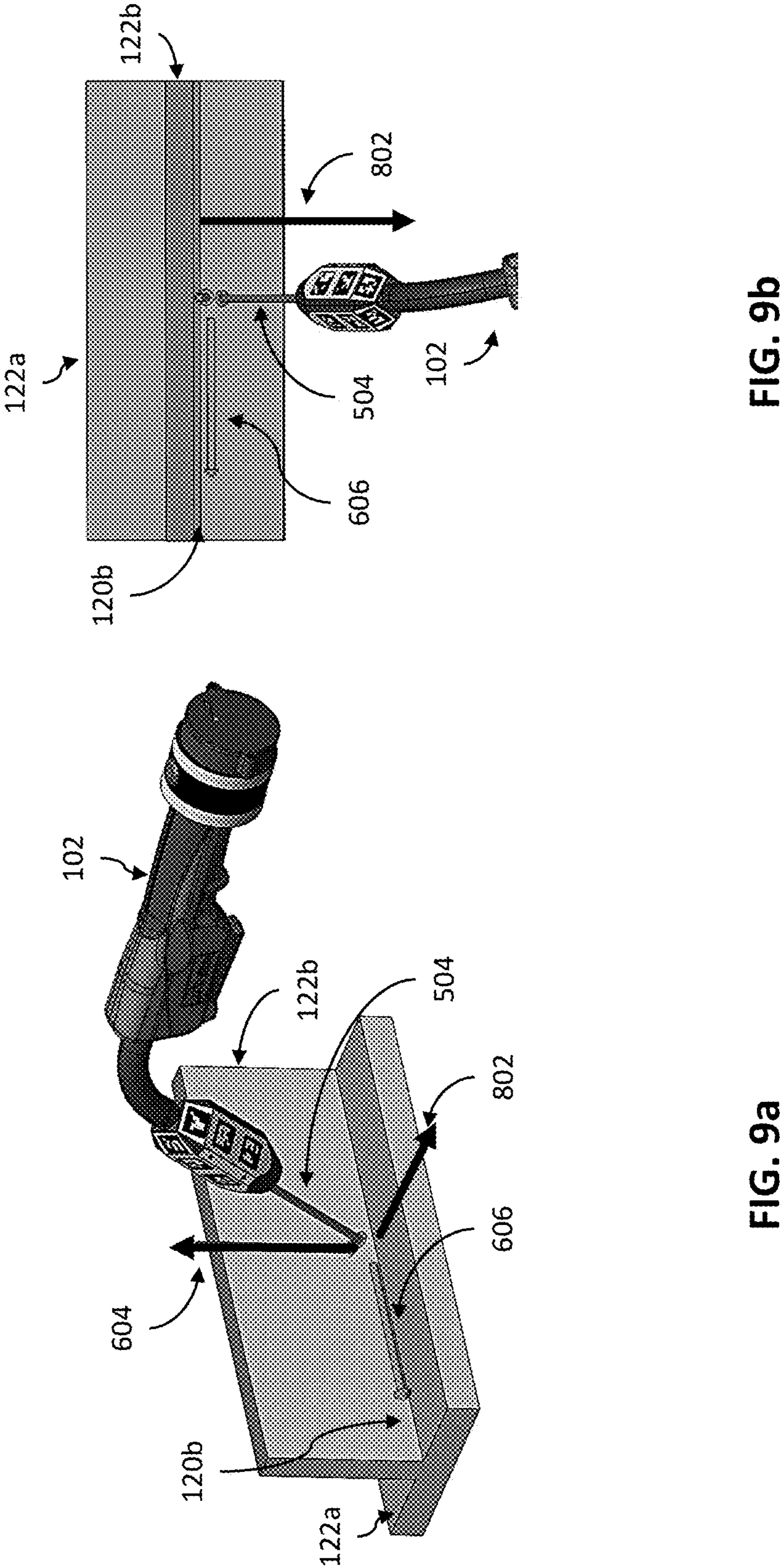
FIGS. 9*a*-9*b* show examples of a horizontally oriented joint, and how several vectors that might be used during the technique monitoring process of FIG. 4 relate to the joint, in accordance with aspects of this disclosure.

FIGS. 8*a*-9*b* show examples of how the aforementioned vectors might correspond to a vertical groove welding joint 120*a* between two workpieces 122, and/or a horizontal fillet welding joint 120*b* between two workpieces 122. In the example of FIGS. 8*a*-8*b*, the welding-type tool 102 is operating on a 3G vertical groove butt joint 120*a* between two workpieces 122. In the example of FIGS. 9*a*-9*b*, the welding-type tool 102 is operating on a 2F horizontal fillet T joint 120*b* between two workpieces 122. In FIGS. 8*a*-9*b*, a tool orientation vector 504, gravity vector 602, joint orientation vector 606, base plate surface vector 802, and base plate perpendicular vector 604 is shown adjacent the workpieces 122.

In the examples of FIGS. 8*a*-8*b*, the joint orientation vector 606 is parallel to the joint 120*a* and the direction of gravity. In some examples, the parallel relationship between the joint orientation vector 606 and direction of gravity makes it easy to identify the joint orientation vector 606 for vertically oriented joints. As shown, the base plate surface vector 802 is perpendicular to the joint orientation vector 606. The base plate surface vector 802 is also perpendicular to the tool orientation vector 504 and the base plate perpendicular vector 604. These latter relationships are somewhat easier to see in FIG. 8*b*, which shows a top down view.

In the examples of FIGS. 9*a*-9*b*, the base plate perpendicular vector 604 is parallel to the direction of gravity. In some examples, this relationship makes it easy to identify the base plate perpendicular vector 604 for horizontally oriented joints; although, in some horizontal joint examples (e.g., 2G/4F-B), the base plate perpendicular vector 604 may instead be perpendicular to the direction of gravity (see, e.g., FIG. 6). As shown, the joint orientation vector 606 is parallel to the joint 120*b*, as well as perpendicular to the base plate perpendicular vector 604 and the tool orientation vector 504. These relationship between the joint orientation vector 606 and tool orientation vector 504 are somewhat easier to see in FIG. 9*b*, which shows a top down view. While also shown in the examples of FIGS. 9*a*-9*b*, in some examples, the base plate surface vector 802 may be less important for horizontal joints, where the base plate perpendicular vector 604 can be determined from the gravity vector 602. In some examples, the base plate surface vector 802 may be more important for vertical joints, where the base plate surface vector 802 is needed to determine the base plate perpendicular vector 604. In any case, the relationships between the vectors allow for the simple and intuitive calibration techniques described above.

The example tool based welding technique monitoring system 300 provides an inexpensive, robust, and portable solution for tracking an orientation of a welding-type tool 102, and providing feedback as to welding technique. The system 300 requires no sensors apart from a simple and/or relatively inexpensive sensor module 200 that can travel with the welding-type tool 102. The system 300 can also provide some feedback with only minimal calibration, allowing for value to be provided even where an operator 110 forgets, or is unwilling to take the time to fully calibrate the system 300. Additionally, full calibration of the system 300 can be accomplished with a fast, simple, intuitive calibration technique.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(*x*), (*y*), (x, y)}. In other words, "x and/or y" means "one or both of x and y". As another example, "x, y, and/or z" means any element of the seven-element set {(*x*), (*y*), (*z*), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type refers to actual live, and/or simulated, welding (including laser welding and/or hot wire welding), cladding (including laser cladding), brazing, plasma cutting, induction heating, carbon arc cutting or gouging, hot wire preheating, and/or resistive preheating.

As used herein, a welding-type tool refers to a tool suitable for and/or capable of actual live, and/or simulated, welding (including laser welding and/or hot wire welding), cladding (including laser cladding), brazing, plasma cutting, induction heating, carbon arc cutting or gouging, hot wire preheating, and/or resistive preheating.

As used herein, welding-type power refers to power suitable for actual live welding (including laser welding and/or hot wire welding), cladding (including laser cladding), brazing, plasma cutting, induction heating, carbon arc cutting or gouging, hot wire preheating, and/or resistive preheating.

As used herein, a welding-type power supply and/or welding-type power source refers to a device capable of, when input power is applied thereto, supplying output power suitable for actual live welding (including laser welding and/or hot wire welding), cladding (including laser cladding), brazing, plasma cutting, induction heating, carbon arc cutting or gouging, hot wire preheating, and/or resistive preheating; including but not limited to transformer-rectifiers, inverters, converters, resonant power supplies, quasi-resonant power supplies, switch-mode power supplies, etc., as well as control circuitry and other ancillary circuitry associated therewith.

As used herein, disable may mean deactivate, incapacitate, and/or make inoperative. As used herein, enable may mean activate and/or make operational.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A method of monitoring welding technique, the method comprising:

determining, via processing circuitry, a first joint characteristic vector and a second joint characteristic vector, both the first joint characteristic vector and the second joint characteristic vector based on both (i) a joint orientation of a joint between a first workpiece and a second workpiece, and (ii) first sensor data detected during a first time duration by a sensor system attached to, or integrated with, a welding-type tool;

tracking, in real time during a welding-type operation, via the processing circuitry, a tool orientation of the welding-type tool using second sensor data detected by the sensor system during a second time duration; and identifying, via the processing circuitry, a welding technique parameter value based on the first or second joint characteristic vector and the tool orientation of the welding-type tool.

2. The method of claim 1, wherein the first sensor data comprises data representative of a gravity vector and a tool orientation vector during the first time duration, the first joint characteristic vector being determined based on the joint orientation and the gravity vector, and the second joint characteristic vector being determined based on the joint orientation, the first joint characteristic vector, and the tool orientation vector.

3. The method of claim 1, wherein the welding technique parameter value is identified in real time during the welding-type operation.

4. The method of claim 3, further comprising identifying the tool orientation vector, via processing circuitry, based on third sensor data detected by the sensor system during a third time duration when the welding-type tool is in a known orientation.

5. The method of claim 1, wherein the welding technique parameter value comprises a work angle value or a travel angle value of the welding-type tool.

6. The method of claim 1, further comprising providing feedback, via a user interface, based on the welding technique parameter value.

7. The method of claim 1, wherein the sensor system comprises an inertial measurement unit comprising an accelerometer, a gyroscope, or a magnetometer, and the sensor data comprises data detected by the inertial measurement unit.

8. A method of monitoring welding technique, the method comprising:

determining, in real time during a welding-type operation, via processing circuitry, a joint characteristic vector based on both (i) a joint orientation and (ii) sensor data of a sensor system attached to, or integrated with, a welding-type tool;

tracking, in real time during the welding-type operation, via the processing circuitry, a tool orientation of the welding-type tool using the sensor data;

identifying, via the processing circuitry, a welding technique parameter value based on the joint characteristic vector and the tool orientation of the welding-type tool.

9. The method of claim 8, wherein the sensor data comprises data representative of a gravity vector, and the joint characteristic vector is determined based on the joint orientation and the gravity vector.

10. The method of claim 9, wherein the sensor system comprises an inertial measurement unit comprising an accelerometer, a gyroscope, or a magnetometer, and the sensor data comprises data detected by the inertial measurement unit.

11. The method of claim 8, further comprising:

determining, via the processing circuitry, that the joint orientation comprises a horizontal joint orientation; and in response to determining the joint orientation comprises the horizontal joint orientation, determining, via the processing circuitry, a horizontal joint position, the joint characteristic vector being determined based on the horizontal joint position and the sensor data of the sensor system.

12. The method of claim 8, wherein the tool orientation of the welding-type tool comprises a tool orientation vector, the tool orientation vector being defined relative to a sensor reference frame of the sensor system, the sensor data comprising data representative of the tool orientation vector or an orientation of the sensor reference frame.

13. The method of claim 8, wherein the welding technique parameter value comprises a work angle value or a travel angle value of the welding-type tool.

14. The method of claim 8, further comprising providing feedback, via a user interface, based on the welding technique parameter value.

15. A welding technique monitoring system, the system comprising:

a sensor system integrated with, or configured for attachment to, a welding-type tool; and processing circuitry configured to:

determine a joint characteristic vector based on both (i) a joint orientation of a joint between a first workpiece and a second workpiece, and (ii) first sensor data detected by the sensor system during a first time duration;

track, in real time during a welding-type operation, a tool orientation of the welding-type tool using the first sensor data, or second sensor data detected by the sensor system during a second time duration; and identify a welding technique parameter value based on the joint characteristic vector and the tool orientation of the welding-type tool.

16. The welding-type tool tracking system of claim 15, wherein the first sensor data comprises data representative of a gravity vector and the processing circuitry is configured to determine the joint characteristic vector based on the joint orientation and the gravity vector.

17. The welding-type tool tracking system of claim 15, wherein the processing circuitry is further configured to: in response to the joint orientation comprising a horizontal joint orientation, identify a horizontal joint position, and determine the joint characteristic vector based on the horizontal joint position and the first sensor data.

18. The welding-type tool tracking system of claim 15, wherein the joint characteristic vector comprises a first joint characteristic vector, and the first sensor data comprises data representative of a gravity vector and a tool orientation vector during the first time period, the processing circuitry being configured to determine the first joint characteristic vector based on the joint orientation and the gravity vector, and determine a second joint characteristic vector based on the joint orientation, the first joint characteristic vector, and the tool orientation vector.

19. The welding-type tool tracking system of claim 18, wherein the processing circuitry is further configured to identify the tool orientation vector based on third sensor data detected by the sensor system during a third time duration, the welding-type tool being in a known orientation during the third time duration.

20. The welding-type tool tracking system of claim 15, wherein the welding technique parameter value is identified in real time during the welding-type operation.

* * * * *